United States Patent
Brown et al.

(10) Patent No.: US 8,311,095 B2
(45) Date of Patent: Nov. 13, 2012

(54) METHOD AND APPARATUS FOR TRANSCODING BETWEEN HYBRID VIDEO CODEC BITSTREAMS

(75) Inventors: Stephen F. Brown, West Ryde (AU); Marwan A. Jabri, Tiburon, CA (US)

(73) Assignee: Onmobile Global Limited (IN)

( * ) Notice: Subject to any disclaimer, the term of this patent is extended or adjusted under 35 U.S.C. 154(b) by 977 days.

(21) Appl. No.: 12/352,544

(22) Filed: Jan. 12, 2009

(65) Prior Publication Data

US 2009/0196344 A1 Aug. 6, 2009

Related U.S. Application Data

(63) Continuation-in-part of application No. 11/862,117, filed on Sep. 26, 2007, which is a continuation-in-part of application No. 10/620,329, filed on Jul. 14, 2003, now abandoned.

(60) Provisional application No. 60/847,464, filed on Sep. 26, 2006, provisional application No. 60/431,054, filed on Dec. 4, 2002, provisional application No. 60/417,831, filed on Oct. 10, 2002, provisional application No. 60/396,891, filed on Jul. 17, 2002, provisional application No. 60/396,689, filed on Jul. 17, 2002.

(51) Int. Cl.
*H04N 11/04* (2006.01)

(52) U.S. Cl. .................................. 375/240.02

(58) Field of Classification Search ............ 375/240.25–240.29, 240.02–240.26, E07.126; H04N 11/04
See application file for complete search history.

(56) References Cited

U.S. PATENT DOCUMENTS

| | | | |
|---|---|---|---|
| 5,897,219 A | 4/1999 | Yoo et al. | |
| 5,940,130 A | 8/1999 | Nilsson et al. | |
| 6,226,328 B1 * | 5/2001 | Assuncao | 375/240.26 |
| 6,339,619 B1 | 1/2002 | Sugiyama | |
| 6,456,661 B1 | 9/2002 | Morel | |
| 6,477,706 B1 * | 11/2002 | Hua et al. | 725/96 |
| 6,526,099 B1 | 2/2003 | Christopoulos et al. | |
| 6,625,216 B1 | 9/2003 | Zhu | |
| 6,647,061 B1 * | 11/2003 | Panusopone et al. | 375/240.12 |
| 6,650,706 B2 * | 11/2003 | Le Maguet | 375/240.12 |
| 6,671,322 B2 | 12/2003 | Vetro et al. | |
| 6,934,334 B2 | 8/2005 | Yamaguchi et al. | |
| 6,999,512 B2 | 2/2006 | Yoo et al. | |
| 7,110,451 B2 | 9/2006 | Nakamura et al. | |

(Continued)

FOREIGN PATENT DOCUMENTS

EP  1-111796 A1  6/2001

(Continued)

OTHER PUBLICATIONS

U.S. Appl. No. 10/620,329, filed Jul. 14, 2003, Brown et al.

(Continued)

*Primary Examiner* — Tung Vo
(74) *Attorney, Agent, or Firm* — Hoffman & Baron, LLP

(57) ABSTRACT

A method and apparatus for performing transcoding between bitstreams coded by hybrid video codecs which uses fewer resources than decoding/decompressing the original bitstream and recoding/recompressing it to the second format. According to a specific embodiment, the present method can exploits the similarity of the standard video compression algorithms to, where possible, convert encoded parameters in the incoming bitstreams directly into encoded parameters which constitute compliant data for the outgoing bitstream.

8 Claims, 22 Drawing Sheets

U.S. PATENT DOCUMENTS

| | | | |
|---|---|---|---|
| 7,142,601 | B2 | 11/2006 | Kong et al. |
| 7,145,946 | B2 | 12/2006 | Lee |
| 7,151,799 | B2 | 12/2006 | Kato et al. |
| 7,170,932 | B2 * | 1/2007 | Vetro et al. .................... 375/240 |
| 2001/0047517 | A1 | 11/2001 | Christopoulos et al. |
| 2004/0057521 | A1 | 3/2004 | Brown et al. |
| 2004/0158647 | A1 | 8/2004 | Omura |
| 2009/0232223 | A1 * | 9/2009 | Ito et al. .................. 375/240.25 |

FOREIGN PATENT DOCUMENTS

| | | |
|---|---|---|
| JP | 06-153180 A | 5/1994 |
| JP | 08-205192 A | 8/1996 |
| WO | WO 01/95633 A2 | 12/2001 |

OTHER PUBLICATIONS

Dogan et al.,"Efficient MPEG-4/H/263 Video Transcoder for Interoperability of Heterogeneous Multimedia Networks" Electronic Letters, May 27, 1999, pp. 863-864, vol. 35, No. 11.

Iwasaki et al.,"Video Transcoding for Wireless Communications Systems," Vechicular Technology Conference Proceedings, 2000, Tokyo, IEEE 51st, May 15-18, 2000, pp. 1577-1580, vol. 2, IEEE.

Lei et al., "H.263 Video Transcoding for Spatial Resolution Downscaling," International Conference on Information Technology: Coding and Computing, Apr. 8-10, 2002, pp. 425-430 at Web link: http://citeseer.ist.psu.edu/617391.html.

Liang et al., "Compressed Domain Transcoding Solutions for MPEG-4 Visual Simple Profile and H.263 Baseline Videos in 3GPP Services and Applications" IEEE Transactions on Consumer Electronics, May 2006, pp. 507-514, vol. 52, Issue 2. IEEE.

Final Office Action for U.S. Appl. No. 10/620,329 mailed on Jul. 11, 2008; 12 pages.

Non-Final Office Action for U.S. Appl. No. 10/620,329 mailed on Dec. 21, 2007; 11 pages.

Final Office Action for U.S. Appl. No. 10/620,329 mailed on Jul. 18, 2007; 12 pages.

Non-Final Office Action for U.S. Appl. No. 10/620,329 mailed on Jan. 5, 2007; 15 pages.

* cited by examiner

METHOD AND APPARATUS FOR TRANSCODING BETWEEN HYBRID VIDEO CODEC BITSTREAMS

CROSS-REFERENCES TO RELATED APPLICATIONS

This application is a continuation-in-part of U.S. patent application Ser. No. 10/620,329, filed on Jul. 14, 2003, which claims priority to U.S. Provisional Patent Application Nos. 60/396,891, filed Jul. 17, 2002; 60/396,689, filed Jul. 17, 2002; 60/417,831, filed Oct. 10, 2002; and 60/431,054, filed Dec. 4, 2002, the disclosures of which are incorporated herein by reference in their entirety for all purposes. This application is also a continuation-in-part of U.S. patent application Ser. No. 11/862,117, filed on Sep. 26, 2007, which claims priority to U.S. Provisional Patent Application No. 60/847,464, filed Sep. 26, 2006, the disclosures of which are incorporated herein by reference in their entirety for all purposes.

BACKGROUND OF THE INVENTION

The present invention relates generally to telecommunication techniques. More particularly, the invention provides a method and system for transcoding between hybrid video CODEC bitstreams. Merely by way of example, the invention has been applied to a telecommunication network environment, but it would be recognized that the invention has a much broader range of applicability.

As time progresses, telecommunication techniques have also improved. There are now several standards for coding audio and video signals across a communications link. These standards allow terminals to interoperate with other terminals that support the same sets of standards. Terminals that do not support a common standard can only interoperate if an additional device, a transcoder, is inserted between the devices. The transcoder translates the coded signal from one standard to another.

- I frames are coded as still images and can be decoded in isolation from other frames.
- P frames are coded as differences from the preceding I or P frame or frames to exploit similarities in the frames.
- B frames are coded as differences from preceding and following frames to further exploit similarities between groups of frames.

Core profile MPEG-4 supports I, P and B frames. Simple profile MPEG-4 and baseline H.263 support only I and P frames. MPEG-4 supports arbitrary frame sizes whereas baseline H.263 only supports limited set of frame sizes.

Some hybrid video codec standards such as the MPEG-4 video codec also supports "Not Coded" frames which contain no coded data after the frame header. Details of certain examples of standards are provided in more detail below.

Certain standards such as the H.261, H.263, H.264 and MPEG-4-video codecs both decompose source video frames into 16 by 16 picture element (pixel) macroblocks. The H.261, H.263 and MPEG-4-video codecs further subdivide each macroblock is further divided into six 8 by 8 pixel blocks. Four of the blocks correspond to the 16 by 16 pixel luminance values for the macroblock and the remaining two blocks to the sub-sampled chrominance components of the macroblock. The H.264 video codec subdivides each macroblock into twenty-four 4 by 4 pixel blocks, 16 for luminance and 8 for sub-sampled chrominance.

Hybrid video codecs generally all convert source macroblocks into encoded macroblocks using similar techniques. Each block is encoded by first taking a spatial transform then quantizing the transform coefficients. We will refer to this as transform encoding. The H.261, H.263 and MPEG-4-video codecs use the discrete cosine transform (DCT) at this stage. The H.264 video codec uses an integer transform.

The non-zero quantised transform coefficients are further encoded using run length and variable length coding. This second stage will be referred to as VLC (Variable Length Coding) encoding. The reverse processes will be referred to as VLC decoding and transform decoding respectively. Macroblocks can be coded in three ways;

- "Intra coded" macroblocks have the pixel values copied directly from the source frame being coded.
- "Inter coded" macroblocks have pixel values that are formed from the difference between pixel values in the current source frame and the pixel values in the reference frame. The values for the reference frame are derived by decoding the encoded data for a previously encoded frame. The area of the reference frame used when computing the difference is controlled by a motion vector or vectors that specify the displacement between the macroblock in the current frame and its best match in the reference frame. The motion vector(s) is transmitted along with the quantised coefficients for inter frames. If the difference in pixel values is sufficiently small, only the motion vectors need to be transmitted.

Generally all the hybrid video codecs often have differences in the form of motion vectors they allow such as, the number of motion vectors per macroblock, the resolution of the vectors, the range of the vectors and whether the vectors are allowed to point outside the reference frame. The process of estimating motion vectors is termed "motion estimation". It is one of the most computationally intensive parts of a hybrid video encoder.

- "Not coded" macroblocks are macroblocks that have not changed significantly from the previous frame and no motion or coefficient data is transmitted for these macroblocks.

The types of macroblocks contained in a given frame depend on the frame type. For the frame types of interest to this algorithm, the allowed macroblock types are as follows;

- I frames can contain only Intra coded macroblocks.
- P frames can contain Intra, Inter and "Not coded" macroblocks.
- B frames contain only Inter or Not coded macroblocks. The Inter macroblocks in B frames can reference the preceding I or P frame and the following I or P frame (the following I or P frame is generally transmitted before the B frame but displayed after the B frame).

Prior to transmitting the encoded data for the macroblocks, the data are further compressed using lossless variable length coding (VLC encoding).

Another area where hybrid video codecs differ is in their support for video frame sizes. MPEG-4 and H.264 support arbitrary frame sizes, with the restriction that the width and height as multiples of 16, whereas H.261 and baseline H.263 only supports limited set of frame sizes. Depending upon the type of hybrid video codecs, there can also be other limitations.

A conventional approach to transcoding is known as tandem transcoding. A tandem transcoder will often fully decode the incoming coded signal to produce the data in a raw (uncompressed) format then re-encode the raw data according to the desired target standard to produce the compressed signal. Although simple, a tandem video transcoder is considered a "brute-force" approach and consumes significant amount of computing resources. Another alternative to tandem transcoding includes the use of information in the motion vectors in the input bitstream to estimate the motion vectors for the output bitstream. Such an alternative approach also has limitations and is also considered a brute-force technique.

From the above, it is desirable to have improved ways of converting between different telecommunication formats in an efficient and cost effective manner.

BRIEF SUMMARY OF THE INVENTION

According to the present invention, techniques for telecommunication are provided. More particularly, the invention provides a method and system for transcoding between hybrid video CODEC bitstreams. Merely by way of example, the invention has been applied to a telecommunication network environment, but it would be recognized that the invention has a much broader range of applicability.

A hybrid codec is a compression scheme that makes use of two approaches to data compression: Source coding and Channel coding. Source coding is data specific and exploits the nature of the data. In the case of video, source coding refers to techniques such as transformation (e.g. Discrete Cosine Transform or Wavelet transform) which extracts the basic components of the pixels according to the transformation rule. The resulting transformation coefficients are typically quantized to reduce data bandwidth (this is a lossy part of the compression). Channel coding on the other hand is source independent in that it uses the statistical property of the data regardless of the data means. Channel coding examples are statistical coding schemes such as Huffman and Arithmetic Coding. Video coding typically uses Huffman coding which replaces the data to be transmitted by symbols (e.g. strings of '0' and '1') based on the statistical occurrence of the data. More frequent data are represented by shorter strings, hence reducing the amount of bits to be used to represent the overall bitstream.

Another example of channel coding is run-length encoding which exploits the repetition of data elements in a stream. Therefore, instead of transmitting N consecutive data elements, the element and its repeat count are transmitted. This idea is exploited in video coding in that the DCT coefficients in the transformed matrix are scanned in a zigzag way after their quantization. This means that higher frequency components which are located at the lower right part of the transformed matrix are typically zero (following the quantization) and when scanned in a zigzag way from top left to bottom right of matrix, a string of repeated zeros emerges. Run-length encoding reduces the amount of bits required by the variable length coding to represent these repeated zeros. The Source and Channel techniques described above apply to both image and video coding.

An additional technique that used in hybrid video codecs is motion estimation and compensation. Motion estimation and compensation removes time-related redundancies in successive video frames. This is achieved by two main approaches in motion estimation and compensation. Firstly, pixel blocks that have not changed (to within some threshold defining "change") are considered to be the same and a motion vector is used to indicate how such a pixel block has moved between two consecutive frames. Secondly, predictive coding is used to reduce the amount of bits required by a straight DCT, quantization, zigzag, VLC encoding on a pixel block by doing this sequence of operation of the difference between the block in question and the closest matching block in the preceding frame, in addition to the motion vector required to indicate any change in position between the two blocks. This leads to a significant reduction in the amount of bits required to represent the block in question. This predictive coding approach has many variations that consider one or multiple predictive frames (process repeated a number of times, in a backward and forward manner). Eventually the errors resulting from the predictive coding can accumulate and before distortion start to be significant, an intra-coding (no predictive mode and only pixels in present frame are considered) cycle is performed on a block to encode it and to eliminate the errors accumulated so far.

According to an embodiment of the present invention, techniques to perform transcoding between two hybrid video codecs using smart techniques are provided. The intelligence in the transcoding is due to the exploitation of the similarity of the general coding principles utilized by hybrid video codecs, and the fact that a bitstream contain the encoding of video sequence can contain information that can greatly simplify the process of targeting the bitstream to another hybrid video coding standard. Tandem video transcoding by contrast decodes the incoming bitstream to YUV image representation which is a pixel representation (luminance and chrominance representation) and re-encode the pixels to the target video standard. All information in the bitstream about Source coding or Channel coding (pixel redundancies, time-related redundancies, or motion information) is unused.

According to an alternative embodiment, the present invention may reduce the computational complexity of the transcoder by exploiting the relationship between the parameters available from the decoded input bitstream and the parameters required to encode the output bitstream. The complexity may be reduced by reducing the number of computer cycles required to transcode a bitstream and/or by reducing the memory required to transcode a bitstream.

When the output codec to the transcoder supports all the features (motion vector format, frames sizes and type of spatial transform) of the input codec, the apparatus includes a VLC decoder for the incoming bitstream, a semantic mapping module and a VLC encoder for the output bitstream. The VLC decoder decodes the bitstream syntax. The semantic mapping module converts the decoded symbols of the first codec to symbols suitable for encoding in the second codec format. The syntax elements are then VLC encoded to form the output bitstream.

When the output codec to the transcoder does not support all the features (motion vector format, frames sizes and type of spatial transform) of the input codec, the apparatus the apparatus includes a decode module for the input codec, modules for converting input codec symbols to valid output codec values and an encode module for generating the output bitstream.

The present invention provides methods for converting input frames sizes to valid output codec frame sizes. One method is to make the output frame size larger than the input frame size and to fill the extra area of the output frame with a constant color. A second method is to make the output frame size smaller than the input frame size and crop the input frame to create the output frame.

The present invention provides methods for converting input motion vectors to valid output motion vectors.

If the input codec supports multiple motion vectors per macroblock and the output codec does not support the same number of motion vectors per macroblock, the number of input vectors are converted to match the available output configuration. If the output codec supports more motion vectors per macroblock than the number of input motion vectors then the input vectors are duplicated to form valid output vectors, e.g. a two-motion vector per macroblock input can be converted to four motion vectors per macroblock by duplicating each of the input vectors. Conversely, if the output codec supports less motion vectors per macroblock than the input codec, the input vectors are combined to form the output vector or vectors.

If the input codec supports P frames with reference frames that are not the most recent decoded frame and the output codec does not, then the input motion vectors need to be scaled so the motion vectors now reference the most recent decoded frame.

If the resolution of motion vectors in the output codec is less than the resolution of motion vectors in the input codec then the input motion vector components are converted to the nearest valid output motion vector component value. For example, if the input codec supports quarter-pixel motion compensation and the output codec only supports half-pixel motion compensation, any quarter-pixel motion vectors in the input are converted to the nearest half-pixel values.

If the allowable range for motion vectors in the output codec is less than the allowable range of motion vectors in the input codec then the decoded or computed motion vectors are checked and, if necessary, adjusted to fall in the allowed range.

The apparatus has an optimized operation mode for macroblocks which have input motion vectors that are valid output motion vectors. This path has the additional restriction that the input and output codecs must use the same spatial transform, the same reference frames and the same quantization. In this mode, the quantized transform coefficients and their inverse transformed pixel values are routed directly from the decode part of the transcoder to the encode part, removing the need to transform, quantize, inverse quantize and inverse transform in the encode part of the transcoder.

The present invention provides methods for converting P frames to I frames. The method used is to set the output frame type to an I frame and to encode each macroblock as an intra macroblock regardless of the macroblock type in the input bitstream.

The present invention provides methods for converting "Not Coded" frames to P frames or discarding them from the transcoded bitstream.

An embodiment of the present invention is a method and apparatus for transcoding between MPEG-4 (Simple Profile) and H.263 (Baseline) video codecs.

In yet an alternative specific embodiment, the invention provides method of providing for reduced usage of reducing memory in an encoder or transcoder wherein a range of motion vectors is provided limited to within the a predetermined neighborhood of the a macroblock being encoded. The method includes determining one or more pixels within a reference frame for motion compensation and encoding the macroblock while the range of motion vectors has been provided within the one or more pixels provided within the predetermined neighborhood of the macroblock being encoded. The method also includes storing the encoded macroblock into a buffer while the buffer maintains other encoded macroblocks.

The present invention provides a method of efficiently coding the coefficients by reducing the computation required in quantization, run-length encoding (RLE) table generation and de-quantization for predictive frame encoding.

The present invention also provides a means to detect the arrival of a new clip or stream in a source switching environment, and reset the decoder for decoding the new arrival clip.

In addition, the invention also provides a method for efficiently controlling the output video bitrate where only occasional rate control is required in the transcoder.

Furthermore, the invention provides a means to share the resource within the transcoder which supports transcoding of input bitstreams of different coding standards to output bitstreams of different coding standard. In another embodiment, it also allows the broadcast of single source to clients supporting multiple video coding standards while reducing computation and other resources required for such broadcasting.

The invention also specifies an apparatus and method for switching between the simple pass-through operation that involves media bitstream conversion without decoding the content of the media bitstream, and a rate converter that changes the bitrate of the incoming bitstream by decoding and re-encoding the media bitstream.

The objects, features, and advantages of the present invention, which to the best of our knowledge are novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

According to the present invention, techniques for telecommunication are provided. More particularly, the invention provides a method and system for transcoding between hybrid video CODEC bitstreams. Merely by way of example, the invention has been applied to a telecommunication network environment, but it would be recognized that the invention has a much broader range of applicability.

Figure 8:
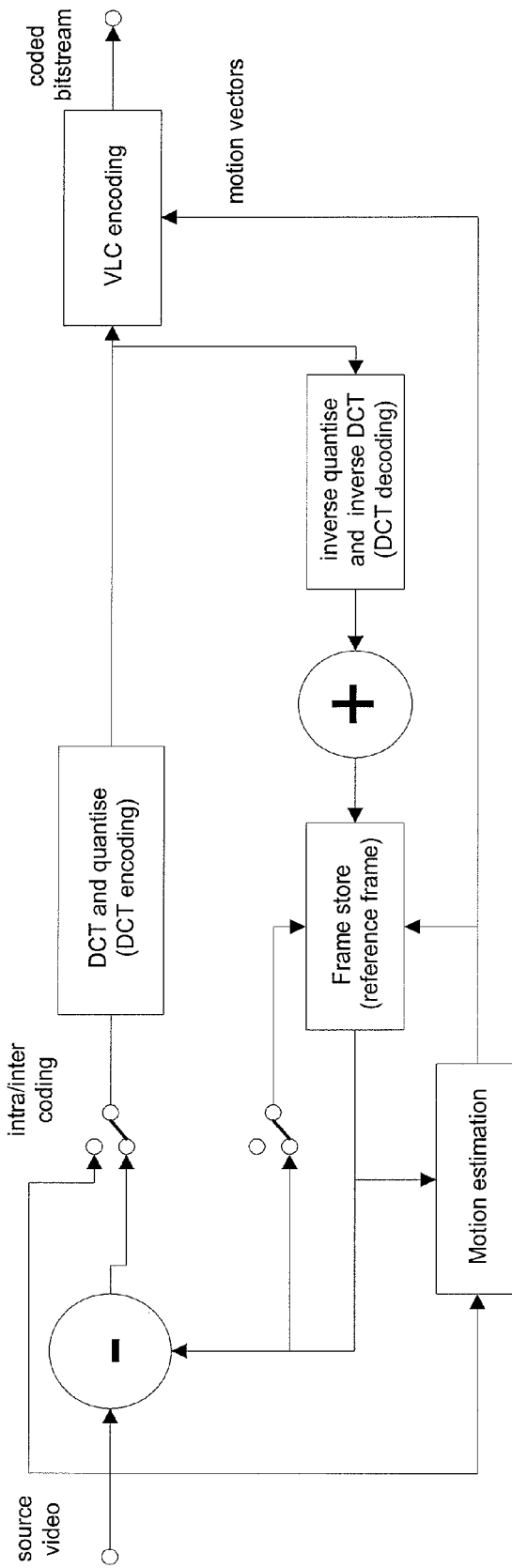
FIG. 8 is a high-level diagram of an encoding process of source video according to an embodiment of the present invention.
Figure 9:
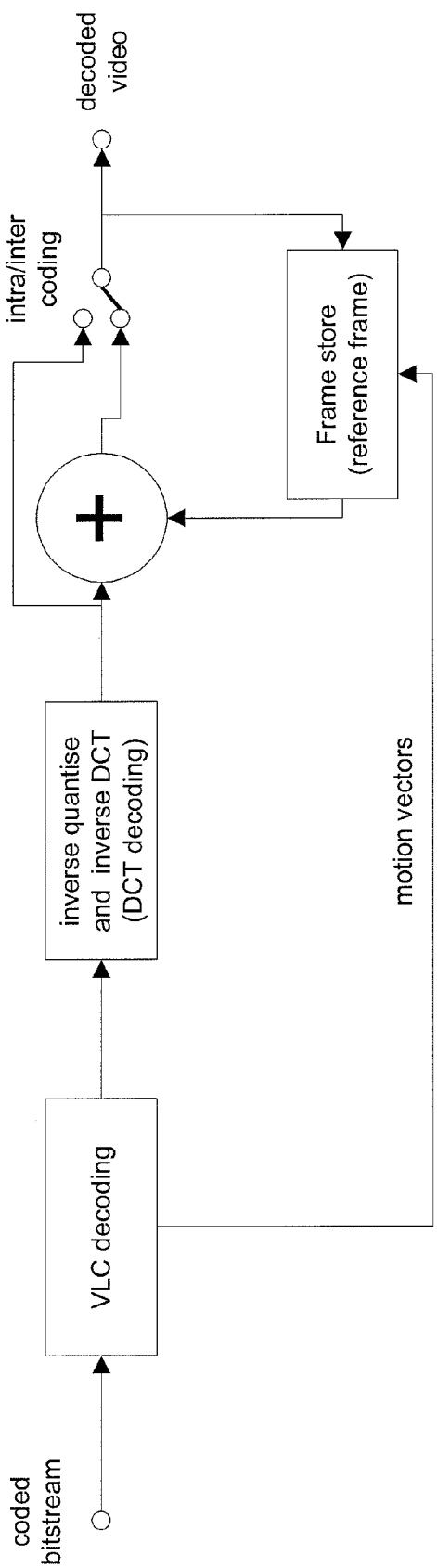
FIG. 9 is a high-level diagram of decoding process of coded bitstream according to an embodiment of the present invention.

An encoding process and decoding process are shown respectively in the two diagrams FIG. 8 and FIG. 9.

The present invention provides a method of converting a baseline H.263 bitstream to a simple profile MPEG-4 video bitstream [2] which eliminates the most computationally demanding steps of a tandem transcoder. It consists of the steps:

VLC decoding of the H.263 bitstream and dequantisation of the transmitted DCT coefficients;

For "Intra coded" macroblocks, perform inverse intra DC and AC prediction. This adjusts the DCT coefficients so the correct values will be obtained in the final MPEG-4 decoder performs DC and AC prediction; and Quantisation and VLC encoding of the DCT coefficients to form the coded MPEG-4 bitstream.

Figure 6:
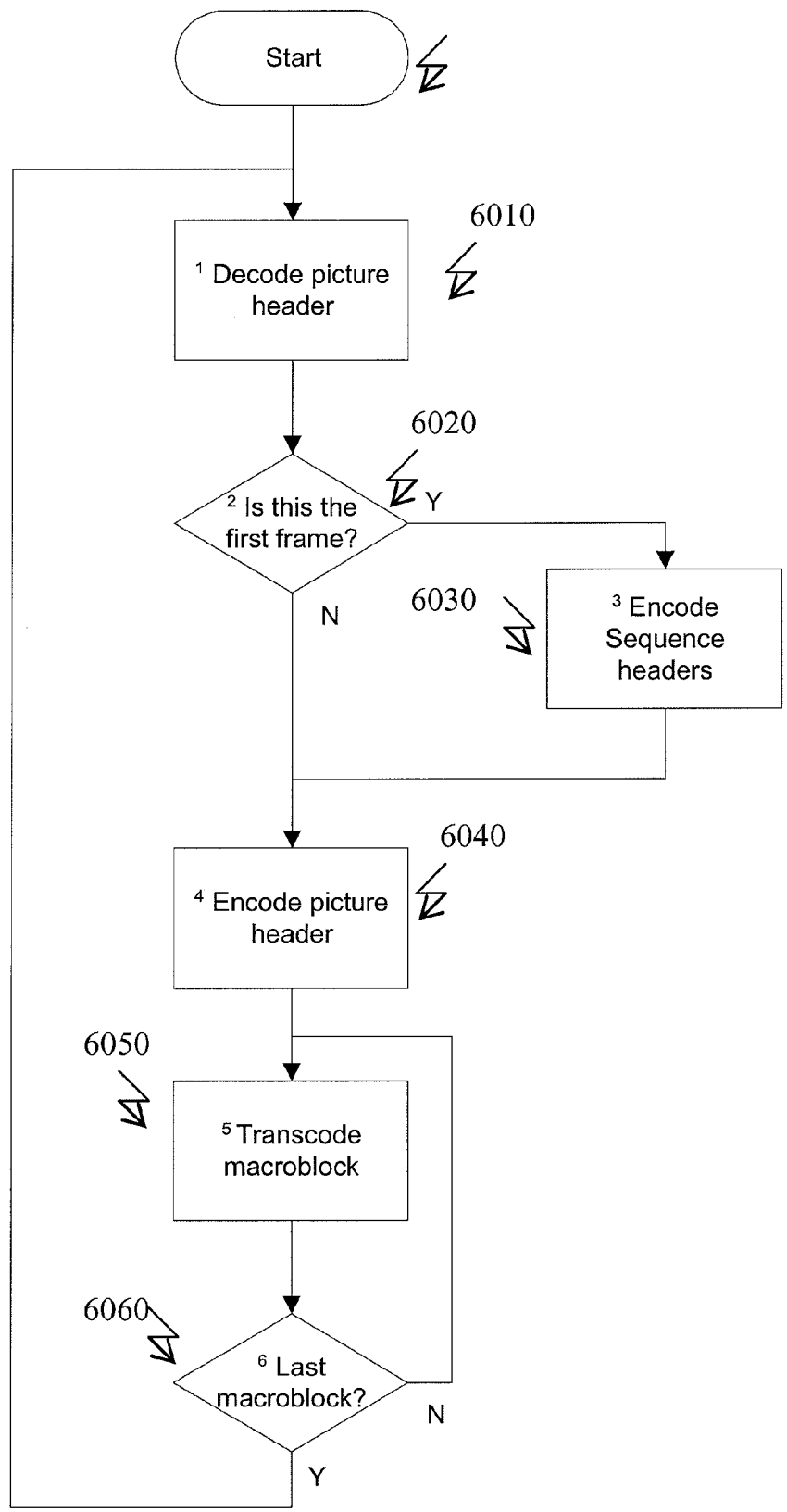
FIG. 6 is a flow chart for the high-level view of frame-level transcoding according to an embodiment of the present invention.

The following paragraphs describe the method in more detail;

For the frame level transcoding, a high-level view of the method is shown in the flowchart of FIG. 6. The steps are as follow:

Step 6010: Decode the picture header at the start of each H.263 coded frame.

Step 6020: Is this is the first frame in the video sequence?

Step 6030: Encode the MPEG-4 sequence headers

Step 6040: Encode the MPEG-4 frame header

Step 6050: Transcode the macroblock data. This is the core part of the algorithm and is described in detail in next paragraph with reference to FIG. 7.

Step 6060: Was the macroblock transcoded at step 5 the last one in the current frame?

Figure 7:
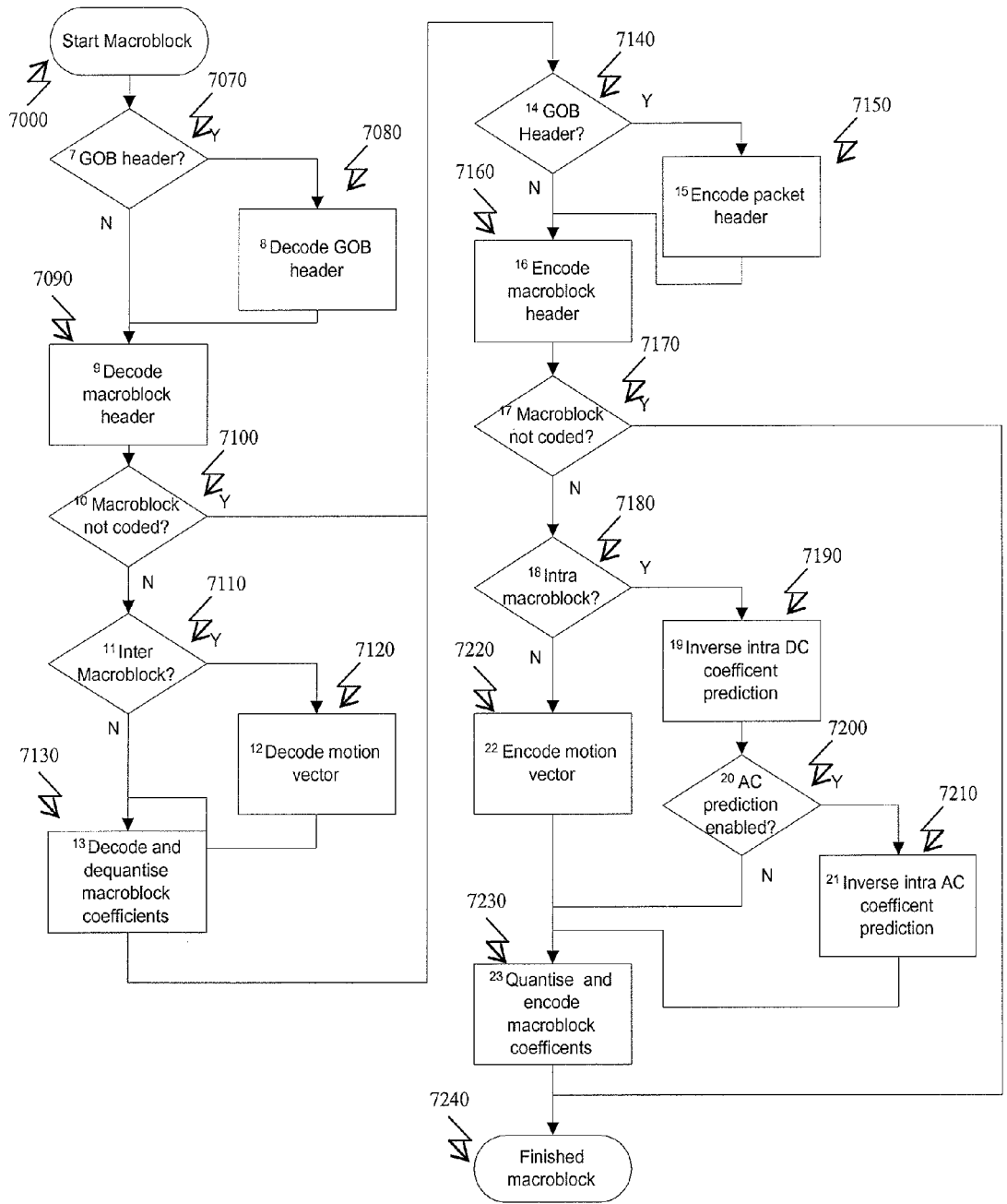
FIG. 7 is a flow chart of macroblock-level transcoding according to an embodiment of the present invention.

For the macroblock transcoding, the macroblock processing is illustrated graphically in the flow chart of FIG. 7.

Step 7070: Check whether a GOB header is allowed at this point in the H.263 bitstream and, if so, check if a GOB header is present.

Step 7080: Decode the information in the GOB header.

Step 7090: Decode the macroblock header.

Step 7100: Use the decoded macroblock header information to check whether the macroblock is marked as not being coded.

Step 7110: Use the decoded macroblock header information to check whether the macroblock is an inter macroblock.

Step 7120: Decode the motion vector information.

Step 7130: Decode and dequantise the macroblock coefficients.

Step 7140: True is a GOB header was detected at step 7070.

Step 7150: Encode the information in the H.263 GOB header as an MPEG-4 packet header.

Step 7160: Encode the macroblock header information.

Step 7170: If the macroblock is not coded then finish.

Step 7180: Use the decoded macroblock header information to check whether the macroblock is an intra macroblock.

Step 7190: Inverse intra predict the DC coefficient of the macroblock so the coefficient value is correctly reconstructed in the final MPEG-4 client.

Step 7200: True if the user has selected AC prediction.

Step 7210: Inverse intra predict the AC coefficients of the macroblock so the coefficient values are correctly reconstructed in the final MPEG-4 client.

Step 7220: Encode the motion vectors.

Step 7230: Quantise and encode the macroblock coefficients. The output quantisation can be selected independently of the quantisation used for the input stream. The quantisation can be used to control the bitrate of the output bitstream.

The key points of the algorithm are described in the following paragraphs.

For transcoding of motion vectors, the H.263 motion vectors are a subset of MPEG-4 motion vectors so the decoded motion vectors can be reused unchanged in the encode stage.

For transcoding of DCT coefficients, the DCT and IDCT processes are the same for both the H.263 and MPEG-4 standards so the transcoder can operate exclusively on the DCT coefficients and not perform any DCT or IDCT operations. The only changes required to the incoming H.263 coefficients is for intra coded macroblocks where DC and, optionally, AC inverse prediction must be performed so that the original H.263 coefficient values will be restored when the final MPEG-4 client performs DC and, optionally, AC prediction.

A method and apparatus of the invention are discussed in detail below. In the following description, for purposes of explanation, numerous specific details are set forth in order to provide a thorough understanding of the present invention. The case of Simple Profile MPEG-4 and Baseline H.263 are used for illustration purpose and for examples. The methods described here are generic and apply to the transcoding between any pair of hybrid video codecs. A person skilled in the relevant art will recognize that other steps, configurations and arrangements can be used without departing from the spirit and scope of the present invention.

The present invention provides a method of converting a coded MPEG-4 bitstream to a coded H.263 bitstream which eliminates the computationally intensive process of motion estimation by computing H.263 motion vectors directly from MPEG4 motion vectors. It consists of the steps:

VLC decoding and DCT decoding the MPEG-4 bitstream, and applying motion compensation to produce a decoded image on a macroblock by macroblock basis.

for each macroblock, converting the macroblock into a format that is supported by H.263 using some or all of the following techniques performing a frame size conversion if the MPEG-4 frame size is not supported by the H.263 standard. This process is described in more detail throughout the present specification.

selecting the H.263 encoding type for the macroblock (Inter, Intra or Not-coded) based on the type of the MPEG-4 macroblock, but with optional forcing to intra macroblocks if the MPEG4 frame is to be converted to an H.263 I frame. This process is described in more detail throughout the present specification.

conversion of MPEG-4 motion vectors that are not in the legal H.263 motion vector range to legal H.263 motion vectors. This process is described in more detail throughout the present specification.

conversion of MPEG-4 B frames to H.263 P frames. This process is described in more detail throughout the present specification.

encoding the H.263 macroblock using the converted macroblock information reducing storage requirements in the encoder stage by buffering a row of macroblocks before writing them to the reference frame. This process is described in more detail throughout the present specification.

The following paragraphs describe the transcoding operations in more detail.

Figure 10:
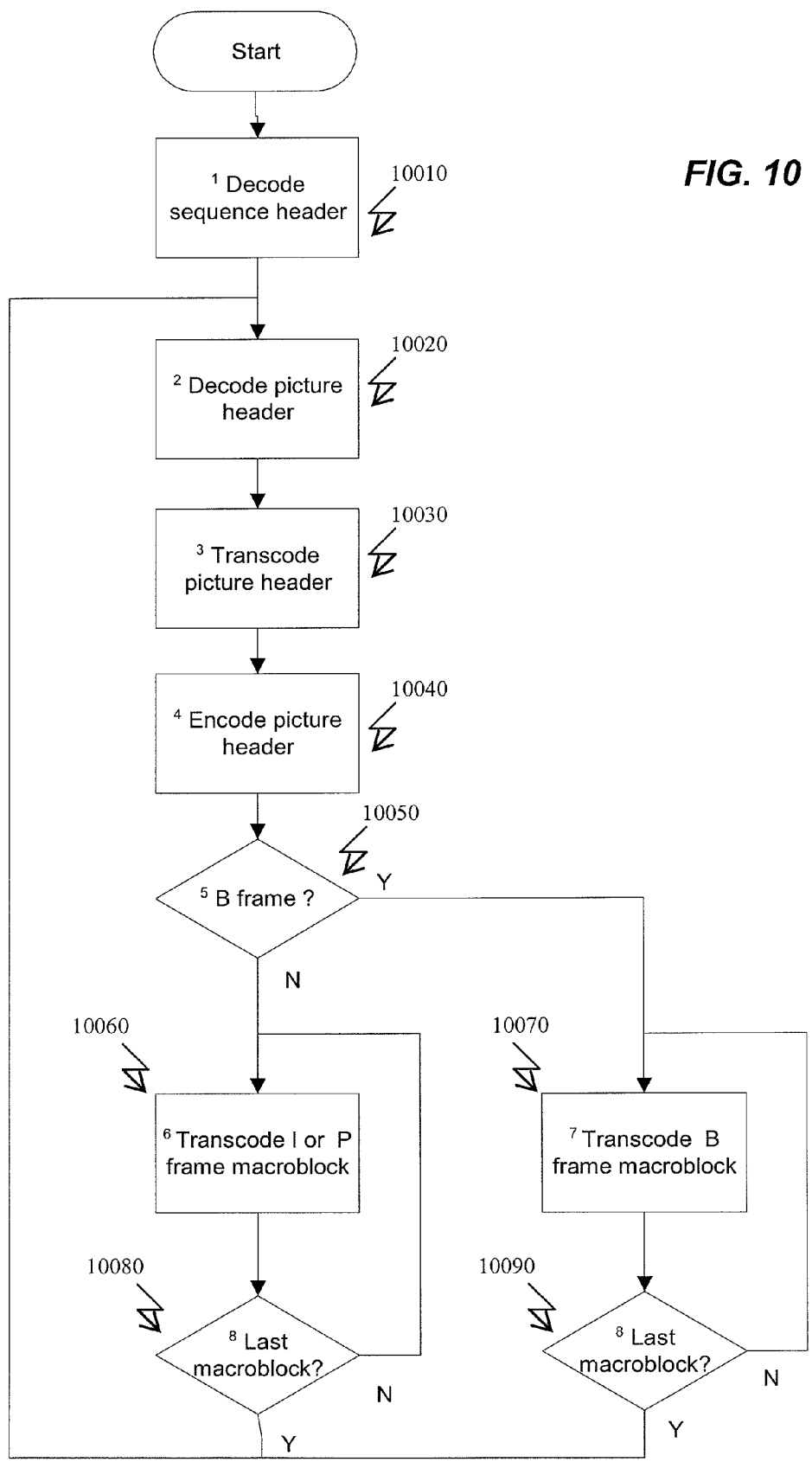
FIG. 10 is a diagram of frame-level transcoding according to an embodiment of the present invention.

For frame level transcoding, the flowchart illustrated with reference to FIG. 10 shows the frame level operations of the algorithm, and individual step is described as follow:

Step 10010: Decode any headers at the start of the MPEG-4 video stream

Step 10020: Decode the MPEG-4 frame header

Step 10030: Transcode the picture header information and select the encoded frame type using the techniques described later.

Step 10040: Encode the transcoded frame header information

Step 10050: Is the frame being decoded a B frame?

Step 10060: Transcode a macroblock of an I or P frame. This process is described in more detail throughout the present specification.

Step 10070: Transcode a macroblock of a B frame. This process is described in more detail throughout the present specification.

Step 10080: Is the macroblock processed in step 10060 the last in the frame?

Step 10090: Is the macroblock processed in step 10070 the last in the frame?

For transcoding I and P frame macroblocks of simple profile MPEG-4 bitstreams, the macroblock can be re-encoded immediately after it has been decoded. When processing core profile MPEG-4 bitstreams, the encoded macroblock is not the decoded macroblock but the macroblock at the corresponding position in the reference frame. Implementations would typically store the macroblock type and motion vector information as well as the macroblock pixels when decoding core profile bitstreams.

Figure 11:
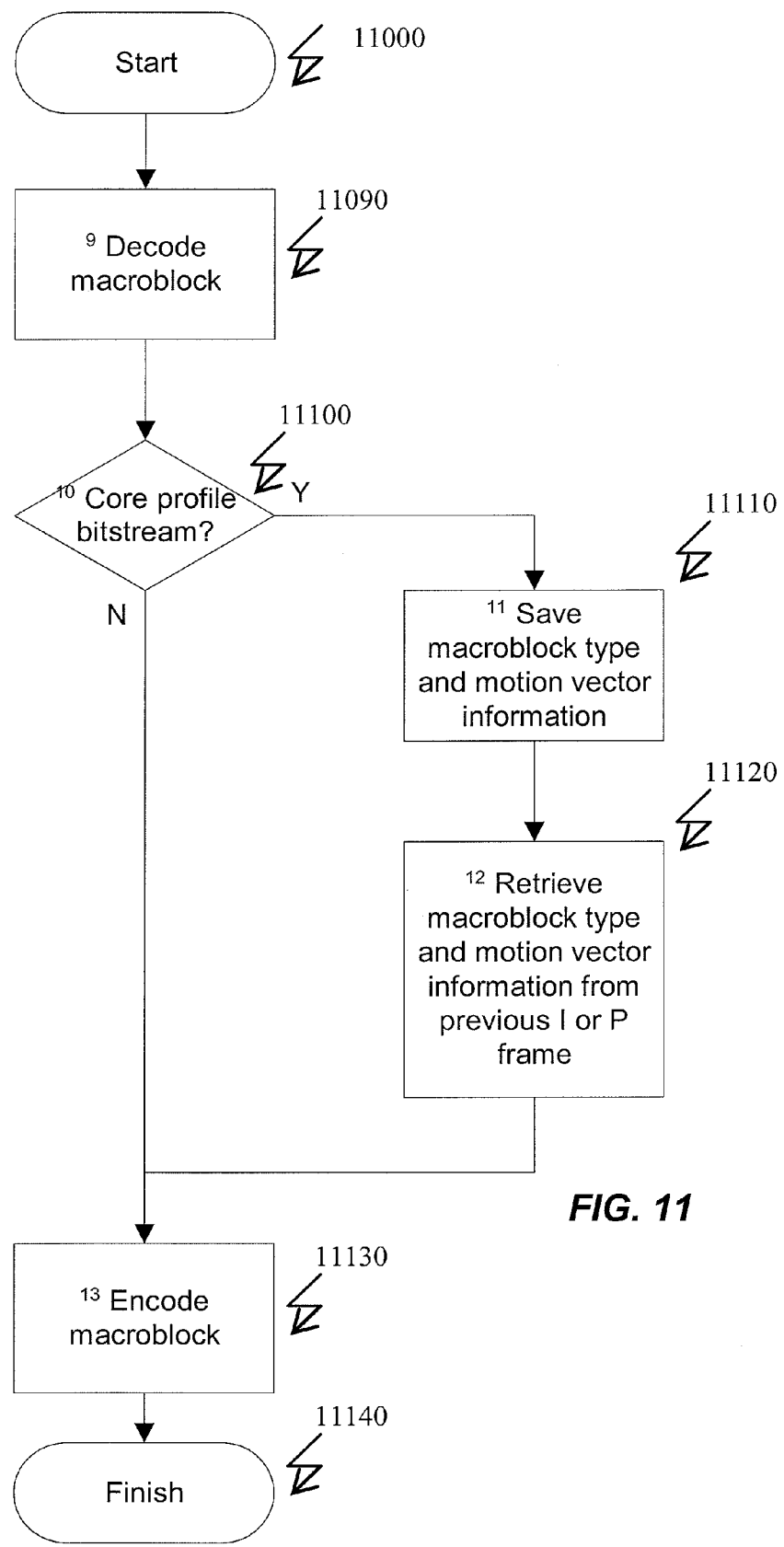
FIG. 11 is a diagram of a transcoding process for I and P frame macroblocks according to an embodiment of the present invention.

The transcoding process for I and P frame macroblocks is shown in the flowchart with reference to FIG. 11.

Step 11090: Decode the macroblock header information from the MPEG-4 bitstream then VLC decode and DCT decode the macroblock data and, for inter macroblocks, apply motion compensation to produce the macroblock pixels, type and, for inter macroblocks, motion vector information.

Step 11100: Is this a core profile MPEG-4 bitstream?

Step 11110: Save the macroblock pixels, type and, for inter macroblocks, motion vector information. Note that this information is stored in a conventional core profile MPEG-4 decoder anyway so the transcoder algorithm does add any additional storage to the decoder.

Step 11120: Retrieve from the previously decoded I or P frame the macroblock pixels, type and, for inter macroblocks, motion vector information.

Figure 13:
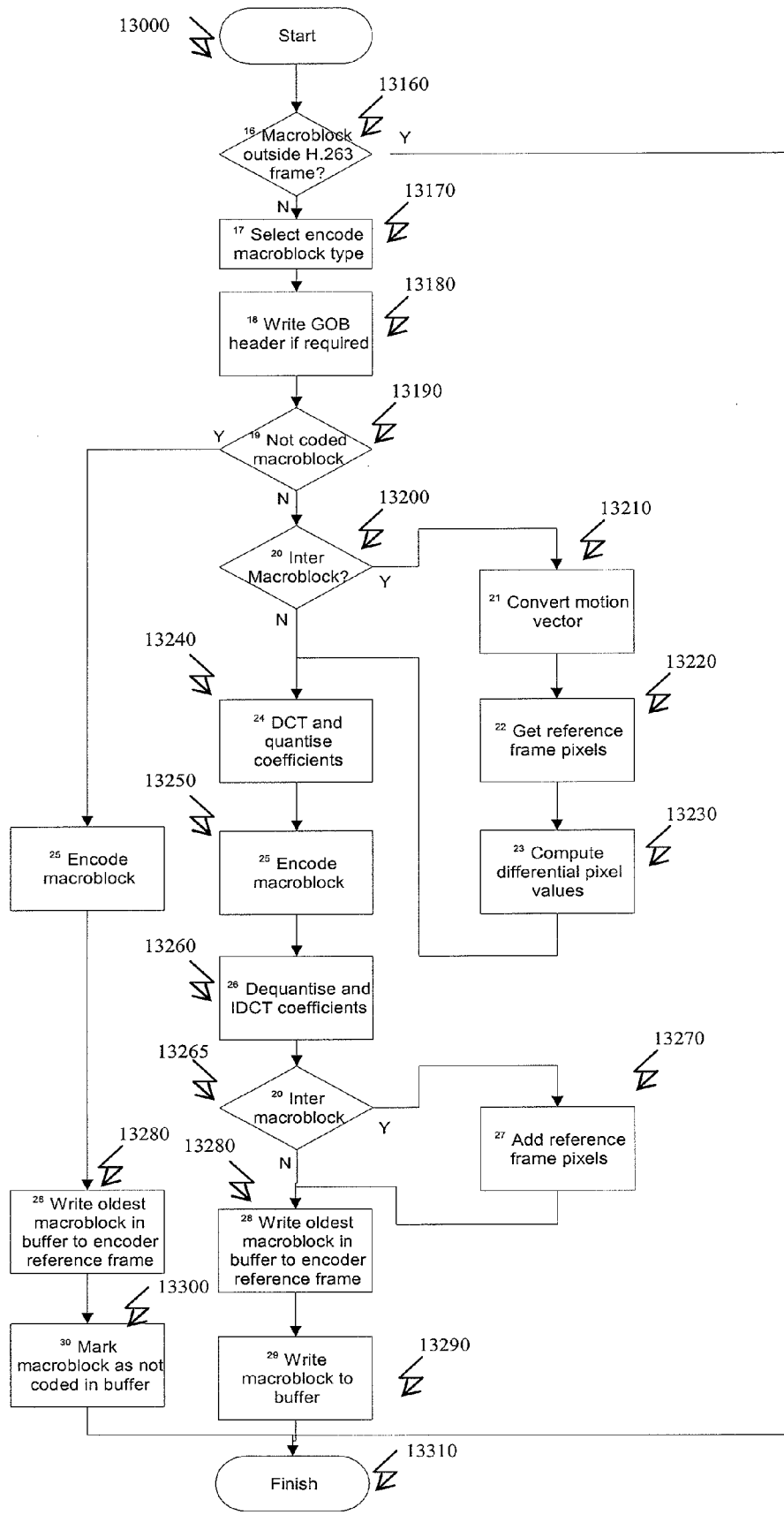
FIG. 13 is a diagram of an algorithm used to encode macroblocks according to an embodiment of the present invention.

Step 11130: Encode the macroblock using the algorithm outlined with reference to FIG. 13.

When processing B frames, the decoded macroblock data is encoded straight away and then discarded. The reference and current frame from the most recently decoded I or P frame are both used as reference frames when the B frame is decoded.

Figure 12:
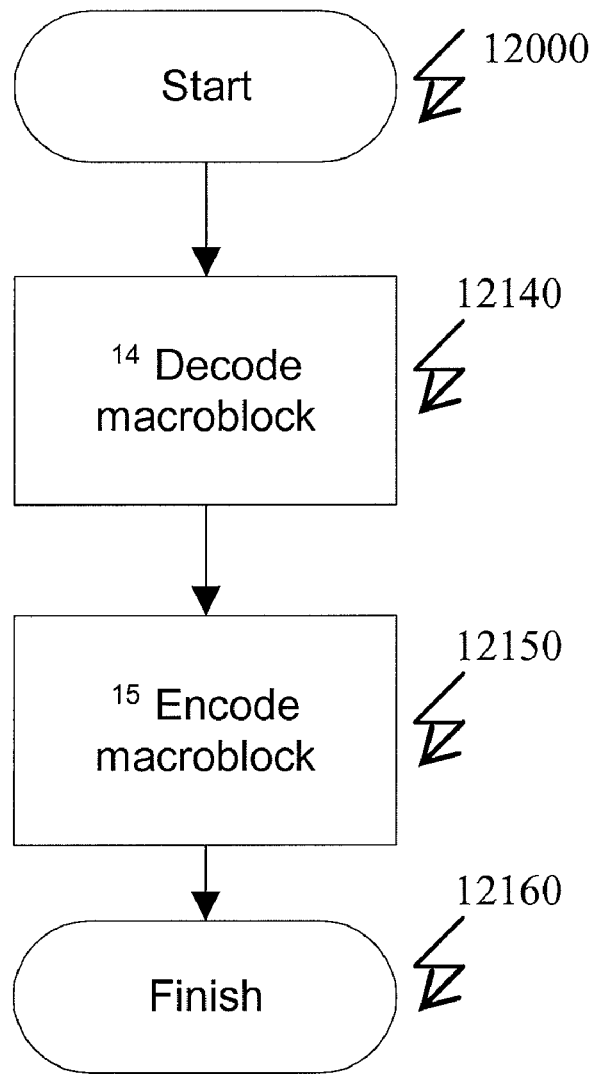
FIG. 12 is a diagram of a transcoding process for B frame macroblocks according to an embodiment of the present invention.

The transcoding process for B frame macroblocks is shown in the flowchart with reference to FIG. 12, and the steps are described as below:

Step 12140: Decode the macroblock header information from the MPEG-4 bitstream then VLC decode and DCT decode the macroblock data and apply motion compensation to produce the macroblock pixels, type and motion vector information.

Step 12150: Encode the macroblock using the algorithm outlined later.

For encoding the macroblocks, the same algorithm is used to encode all macroblocks regardless of the original MPEG-4 frame type. The algorithm is illustrated in the flowchart with reference to FIG. 13, and the steps are described as below:

Step 13160: If the MPEG-4 macroblock is outside the area of the supported H.263 frame size then do not encode the macroblock.

Step 13170: If the decoded frame is to be converted to an I frame then the encoded macroblock type is set to intra, otherwise it is set to the decoded macroblock type.

Step 13180: Check whether a GOB header is allowed at this point in the H.263 bitstream and whether the user requires GOB headers in the H.263 stream. If so, write a GOB header to the output bitstream.

Step 13190: Is the macroblock type "not coded"?

Step 13200: Is the macroblock to be inter coded?

Step 13210: Convert the decoded motion vector or vectors to a valid H.263 motion vector using the techniques described later.

Step 13220: Use the motion vector calculated in step 0 to retrieve the reference pixel values from the encoder reference frame.

Step 13230: Calculate the macroblock difference data by subtracting reference pixel values from the decoded macroblock pixel values.

Step 13240: Prepare the macroblock data for encoding by calculating quantised DCT coefficients. The quantisation can be different from the input bitstream quantisation, allowing the transcoder to control the bitrate of the transcoded bitstream.

Step 13250: Encode the macroblock header, motion vectors if macroblock is inter coded and macroblock coefficients. The coefficients are first DCT encoded then VLC encoded.

Step 13260: Reconstruct the macroblock data that will be calculated by the final H.263 decoder by DCT decoding the DCT coded coefficients from the previous step.

Step 13270: Add the reference macroblock pixels to the reconstructed macroblock data Step 13280: Write the oldest macroblock in the encoder's macroblock buffer to the encoder reference frame.

Step 13290: Write the reconstructed macroblock data from step 23 to the encoder reference frame.

Step 13300: Signal to the macroblock buffer that the current macroblock data is unchanged from the existing reference frame data for that macroblock.

Figure 1:
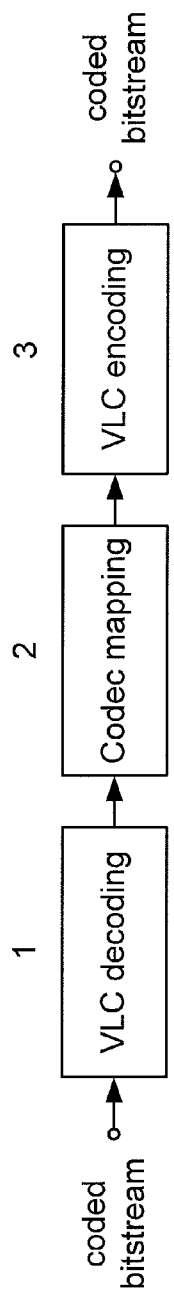
FIG. 1 is a simplified block diagram illustrating a transcoder connection from a first hybrid video codec to a second hybrid video codec where the second codec supports features of the first codec according to an embodiment of the present invention.

FIG. 1 is a block diagram of the preferred embodiment for transcoding between two codecs where the first codec (the input bitstream) supports a subset of the features of the second codec (the output bitstream) according to an embodiment of the present invention. This diagram is merely an example and should not unduly limit the scope of the claims herein. One of ordinary skill in the art would recognize many variations, alternatives, and modifications. The input bitstream is decoded by a variable length decoder 1. Any differences in the semantics of the decoded symbols in the first video codec and their semantics in the second video codec are resolved by the semantic conversion module 2. The coefficients are variable length coded to form the output bitstream 3. The output of stage 1 is a list of codec symbols, such as macroblock type, motion vectors and transform coefficients. The output of stage 2 is previous list with any modifications required to make the symbols conformant for the second codec. The output of stage 3 is the bitstream coded in the second codec standard.

Figure 2:
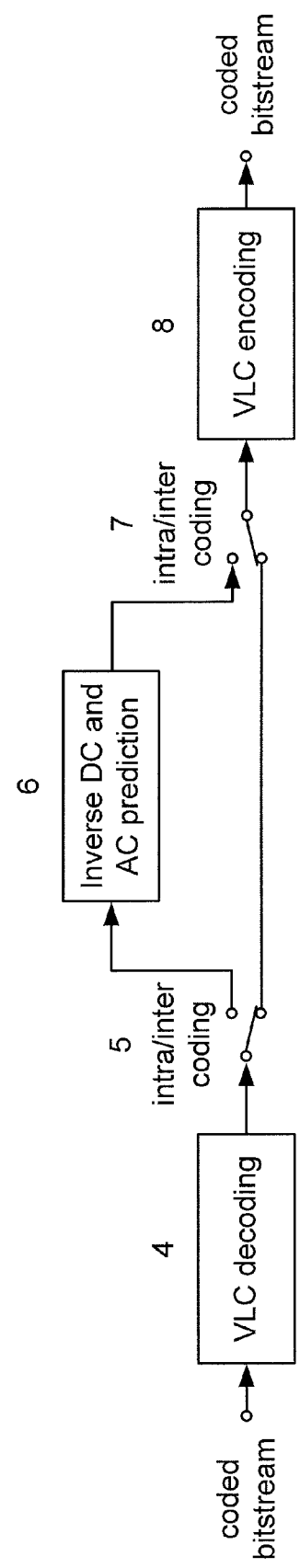
FIG. 2 is a simplified block diagram illustrating a transcoder connection from H.263 to MPEG-4 according to an embodiment of the present invention.

FIG. 2 is a block diagram of the preferred embodiment for transcoding a baseline H.263 bitstream to a MPEG-4 bitstream according to an embodiment of the present invention. This diagram is merely an example and should not unduly limit the scope of the claims herein. One of ordinary skill in the art would recognize many variations, alternatives, and modifications. The input bitstream is decoded by a variable length decoder 4. If the macroblock is an intra coded macroblock, the decoded coefficients are inverse intra predicted 6. Intra prediction of the DC DCT coefficient is mandatory. The transcoder may choose whether to use optional intra AC coefficient prediction. This process is the inverse of the intra prediction specified in the MPEG-4 standard. The coefficients are variable length coded to form the output bitstream 8.

When transcoding a H.263 bitstream to a MPEG-4 bitstream, the transcoder will insert MPEG-4 VisualObjectSequence, VisualObject and VideoObjectLayer headers in the output bitstream before the first transcoded video frame. The semantic conversion module 2 inserts VisualObjectSequence, VisualObject and VideoObjectLayer before the first symbol in the input list.

When transcoding a H.263 bitstream to a MPEG-4 bitstream, the picture headers in the H.263 bitstream are converted to VideoObjectPlane headers in the transcoded bitstream. The semantic conversion module 2 replaces every occurrence of "Picture header" by "VideoObjectPlane header".

When transcoding a H.263 bitstream to a MPEG-4 bitstream, if the H.263 bitstream contains GOB headers, they are converted to video packet headers in the output bitstream. The semantic conversion module 2 replaces every occurrence of "GOB header" by "video packet header".

Figure 3:
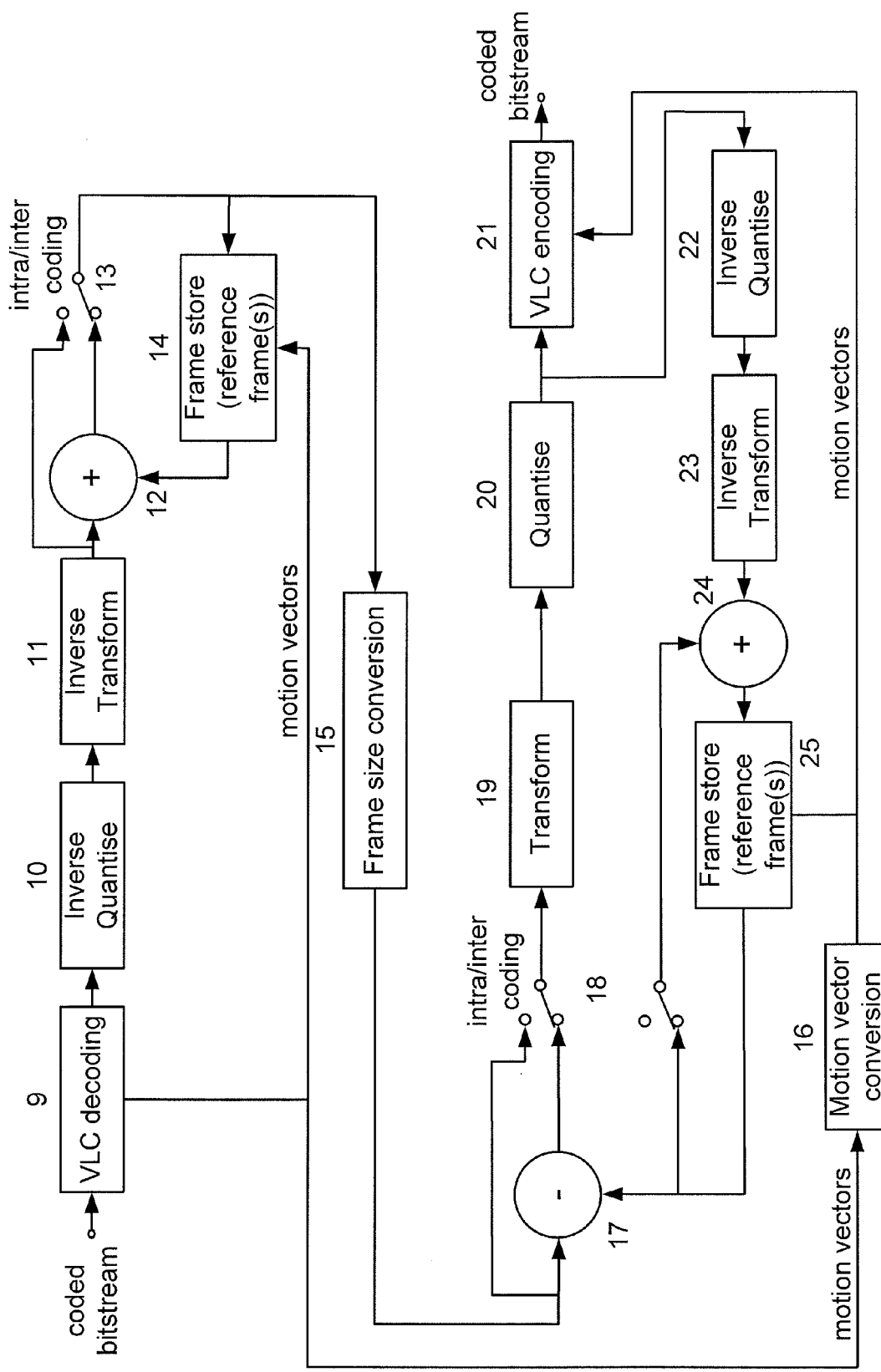
FIG. 3 is a simplified block diagram illustrating a transcoder connection from a hybrid video codec to second hybrid video codec according to an embodiment of the present invention.

FIG. 3 is a block diagram of the preferred embodiment for transcoding between two hybrid video codecs when the output codec to the transcoder does not support the features (motion vector format, frames sizes and type of spatial transform) of the input codec according to an embodiment of the present invention. This diagram is merely an example and should not unduly limit the scope of the claims herein. One of ordinary skill in the art would recognize many variations, alternatives, and modifications. The incoming bitstream is variable length decoded 9 to produce a list of codec symbols such as macroblock type, motion vectors and transform coefficients. The transform coefficients are inverse quantised 10 and then an inverse transform 11 converts the coefficients to the pixel domain, producing a decoded image for the current macroblock. For inter coded macroblock, this image is added 12 to the motion compensated macroblock image recovered from the reference frame 14. This comprises a standard decoder for the input hybrid video codec.

Some output video codec standards allows the decoder to support only a subset of the frame sizes supported by the input codec. If the input frame size is not supported by output codec, the transcoder outputs the largest legal output frame that entirely contains the input frame and performs frame size conversion 15. The output frame is centered on the input frame. If the input frame is an I frame, the areas of the output frame that are outside the input frame are coded as a suitable background color. If the input frame is a P frame, areas of the output frame that are outside the input frame are coded as not coded macroblocks.

An alternative method to achieve frame size conversion is for the transcoder to output the largest legal output frame size that fits entirely within the input frame. The output frame is centered in the input frame. In this case, the frame size conversion module 15 will crop the input frame, discarding any input macroblocks that fall outside the output frame boundaries.

There are four features of motion vectors that may be supported by the input codec but not supported by output codec. They are differences in the number of motion vectors per macroblock, differences in the reference frame used for the motion compensation, differences in the resolutions of the motion vector components, differences in the allowed range of the motion vectors. In each case, the motion vector conversion unit 16 of the transcoder must choose a valid output motion vector that "best approximates" the input motion information. These conversions may result in either loss of image quality and/or an increase in the outgoing bitstream size.

When the input motion vector(s) is different from the output motion vector(s), it is necessary to re-compute the macroblock error coefficients during the encode stage using the encoder reference frame 25.

Figure 23:
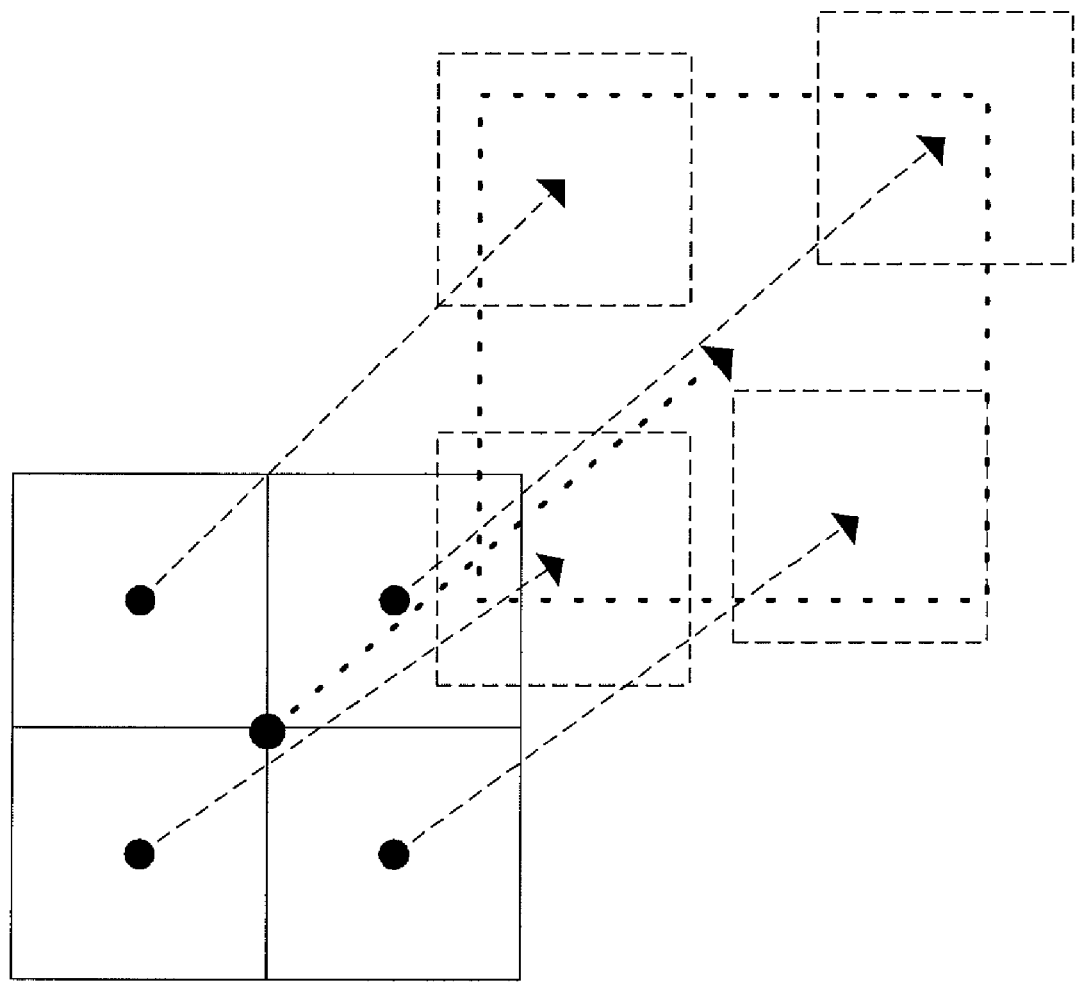
FIG. 23 illustrates combining four input motion vectors to form one output motion vector according to an embodiment of the present invention.

If the input codec supports multiple motion vectors per macroblock and the output codec does not support the same number of motion vectors per macroblock, the number of input vectors are converted to match the available output configuration. If the output codec supports more motion vectors per macroblock than the number of input motion vectors then the input vectors are duplicated to form valid output vectors, e.g. a two-motion vector per macroblock input can be converted to four motion vectors per macroblock by duplicating each of the input vectors. Conversely, if the output codec supports less motion vectors per macroblock than the input codec, the input vectors are combined to form the output vector or vectors. FIG. 23 shows four input motion vectors that are combined to form one output motion vector. For example, when a MPEG-4 to H.263 transcoder encounters an input macroblock with 4 motion vectors, it must combine the 4 vectors to obtain a single output motion vector.

One method for combining motion vectors is to use the means of the x and y components of the input vectors.

Another method is to take the medians of the x and y components of the input vectors.

The conversion from multiple input motion vectors to a required number of output motion vectors is always performed first and the resulting vector(s) are used as the input for the following conversions if they are required.

If the input codec supports P frames with reference frames that are not the most recent decoded frame and the output codec does not, then the input motion vectors need to be scaled so the motion vectors now reference the most recent decoded frame. The scaling is performed by dividing each component of the input vector by the number of skipped reference frames plus one.

If the resolution of motion vectors in the output codec is less than the resolution of motion vectors in the input codec then the input motion vector components are converted to the nearest valid output motion vector component value. For example, if the input codec supports quarter-pixel motion compensation and the output codec only supports half-pixel motion compensation, any quarter-pixel motion vectors in the input are converted to the nearest half-pixel values.

When the transcoder encounters input motion vectors with one or both components outside the range allowed for the output codec it must convert the vector to an allowed output value. A similar situation arises when the input motion vectors can point to areas outside the video frame boundary and the output motion vectors are restricted to pointing within the image. In both cases the algorithm selects a valid output vector based on the input vector.

One method of conversion is to clamp the output motion vector component to the closest allowable value. For example, MPEG-4 motion vectors can be larger than the H.263 range of −16 to 15.5 pixels. In this case the x component of the computed H.263 vector, A is given by $$u^x = \begin{cases} -16 & v^x < -16 \\ v^x & -16 \leq v^x < 16 \\ 15.5 & v^x \geq 16. \end{cases}$$

A second method of conversion is to make the output vector the largest valid output vector with the same direction as the input vector.

After frame size and motion vector conversion, the decoded macroblock pixels are spatially transformed 19, after having the motion compensated reference values 25 subtracted 17 for inter macroblocks. The transform coefficients are quantised 20 and variable length encoded 21 before being transmitted. The quantised transform coefficients are inverse quantised 22 and converted to the pixel domain by an inverse transform 23. For intra macroblocks, the pixels are stored directly in the reference frame store 25. Inter macroblocks are added 24 to the motion compensated reference pixels before being stored in the reference frame store 25.

Additional measures may be applicable when converting motion vectors in bi-directionally predicted frames (B frames). The macroblocks in these frames have motion vectors that can refer to either the previous reference frame or the future reference frame or both reference frames. There can be multiple B frames between a pair of reference frames.

The conversion problem is described below with reference to FIG. 20. Frame 4 in the MPEG-4 sequence has motion vectors v1 and v2 that refer to frame 1 and frame 5 respectively. The motion vector, v3, which we generate for frame 4 in the H.263 sequence, can only refer to frame 3 of the H.263 sequence.

Motion vectors that reference the past frame are treated in a similar way to motion vectors in sequences without B frames. The only difference is that they are scaled by the number of B frames that have passed since the reference frame. This is because the H.263 motion vectors must refer to the previous frame transmitted by the transcoder rather than the previous input reference frame. For example, in the case shown in the diagram, the motion vector v1 is divided by three to form a H.263 motion vector.

Motion vectors that reference the future reference frame are converted to H.263 by reversing their direction and scaling by the number B frames between the current frame and the reference frame.

The H.263 motion vectors for bi-directionally predicted and direct mode macroblocks are formed by averaging the H.263 motion vectors derived from the previous and future MPEG-4 motion vectors. In the example shown in the diagram, the output motion vector v3=v1/3−v2.

After the H.263 motion vector has been calculated it is necessary to re-compute the macroblock error coefficients using the calculated motion vector and the encoder reference frame.

For conversion of B and P frames to I frames, the H.263 standard specifies that each macroblock must be intra coded at least once every 132 frames. There is no similar requirement in the MPEG-4 standard. In our method, to ensure that each macroblock satisfies the H.263 intra coding constraint, the transcoder tracks the number of frames since the last MPEG-4 I frame and, if there are more than 131 P and B frames in the MPEG-4 stream since the last I frame, forcibly re-encodes the decoded P or B frame macroblocks It is not always necessary that rate control be applied in the transcoder. For example, in the case of transcoding from packet switched (relatively free bandwidth) to circuit switched (constrained bandwidth), the output bandwidth is already known. In most cases, the video from packet side is coded with bitrate close to the required bandwidth, with only occasional overflow. In other cases, the bandwidth in the output might be reduced occasionally, due to sudden overhead required during transmission of the data. Thus, occasional transrating is required in order to avoid buffer overflowing in the transcoder (or worse introducing delay into the output channel by over providing media). A technique for temporarily adjusting the video rate is thus desirable to increase speed and channel density of the transcoder.

One mechanism to allow for this calculates the outgoing QP is using a function of the incoming QP and a multiplier. The multiplier value is set according to the status of the transcoder. In one embodiment, it is a value between 1 and 10, where each increment of the multiplier value indicates a probable decrease of the bitrate by an amount, for instance, by 10%. In one embodiment, a look-up table in the form of a matrix can be used to reference the output QP from the input QP and the multiplier. Where the incoming QP value become an index into the row of the table, while the multiplier become the index into the column of the table, and from the location, the output QP is selected.

In another embodiment, the outgoing QP is a function of the incoming QP, multiplier and an indication as to whether a frame drop should occur, or outgoing macroblocks should be forced to Non-coded blocks. A frame drop signifies that the outgoing bitrate will be decreases, allow more bits to be used for coding. In one embodiment, a 3D look up table in the form of matrix. This is similar to the look-up table previously described, except that the third dimension is an index to the number of frame drop. After which the 2D matrix is selected, the incoming QP value become an index into the row of the matrix, while the multiplier become the index into the column of the matrix, and from the location, the output QP is selected.

In another embodiment, the outgoing QP is a function of the incoming QP, incoming data size, outgoing QP, frame drop or non coded outgoing macroblock, and the data size of the frame drop or non coded outgoing macroblock.

A method to handle successfully the arrival of a media transition such as a new media stream/source or a new clip arrival has been proposed. Here, SSRC from RTP is used as an indicator. When an RTP packet arrives, the SSRC is checked. If this is different from the SSRC that it already has, a decoder should terminate the decoding of the previous frame, and start decoding the new frame.

In some cases where limited alternation is allowed in the decoder to restart decoding the following clip, a means external to the decoder is used to force the decoder to terminate current decoding procedure and reset the state ready for decoding the next clip. In one embodiment, the algorithm will input series of bits into the bitstream between the last decoded clip, and before the new incoming clip, into the decoder. These bits force the error recovery state of the decoder. In one embodiment, the series of bits is bytes of zeros, and the length is long enough to force an error recovery, for example, 64 bytes.

Another important benefit and aim of transcoding is the reduction in computation cost, especially for embedded systems with limited resources and computation power. Iteration over the coefficients for encoding can be expensive. For example, for P macroblock encoding requires quantization of all coefficients, followed by the de-quantization of coefficients to construct the reference frame. The use of multiple iterative loops can be expensive, especially when a conditional statement is placed within the loop, whereby often DSP pipelining cannot be executed efficiently (creation of an efficient kernel of instructions is sometimes affected by a conditional or too many conditionals). A way to overcome this is to reduce the number of iterations in the calculation and group certain operation together. For P macroblock encoding, two iterations of the coefficients are done:

In the first iteration go through all the coefficients, quantize them, and buffer up the non-zero coefficients after quantization during the process.

In the second iteration, the loop iteration goes through all the non-zero coefficients, and generates Run-Length-Encoding (RLE) code, and within the same loop, de-quantize the variables for construction of the reference frame coefficients. Where circumstances allow, the decoding of the transform coefficients is performed during the same loop.

The efficiency can also be improved in the case of transcoding. If the current decoded frame is an Intra macroblock, or in case where a predictive frame is used, and the previously decoded reference area in the decoder is the same or similar or has the same values to the reference area used to encode the macroblock in the encoder (this implies in the case of prediction from other frame, same motion vectors are used), and similar coding mode is used, then:

Within the decoder, during the decoding of the coefficients, the locations of the non-zero coefficients are tracked.

Within the encoder, during the encoding of the coefficients, only the coefficients in the location where the non-zero coefficients in the decoder are used for encoding, or quantization if necessary. Those coefficients in the location that are indicated as zero coefficients during the decoding are being ignored during encoding. This technique can be utilized in the first loop during quantization.

In another embodiment, if all the conditions for encoding the macroblocks are satisfied, there is only a single loop for quantization, RLE table generation, and de-quantization is required in the encoding. Thus, the locations of the non-zero coefficients are being noted during decoding in the decoder, and during the encoding of the coefficients, the encoder loops through only the coefficients in the location where the non-zero coefficients in the decoder are found, and quantizes these coefficients, generates the RLE table, and re-quantizes for reference frame generation.

In yet another embodiment, during the transcoding, if all conditions for encoding the macroblocks are satisfied, the transcoding of quantization is performed in a single loop, whereby the coefficients are de-quantized with the decoder QP, and quantized with encoder QP, and produced RLE table for the encoder, and re-quantized with encoder QP for reference frame generation.

Figure 4:
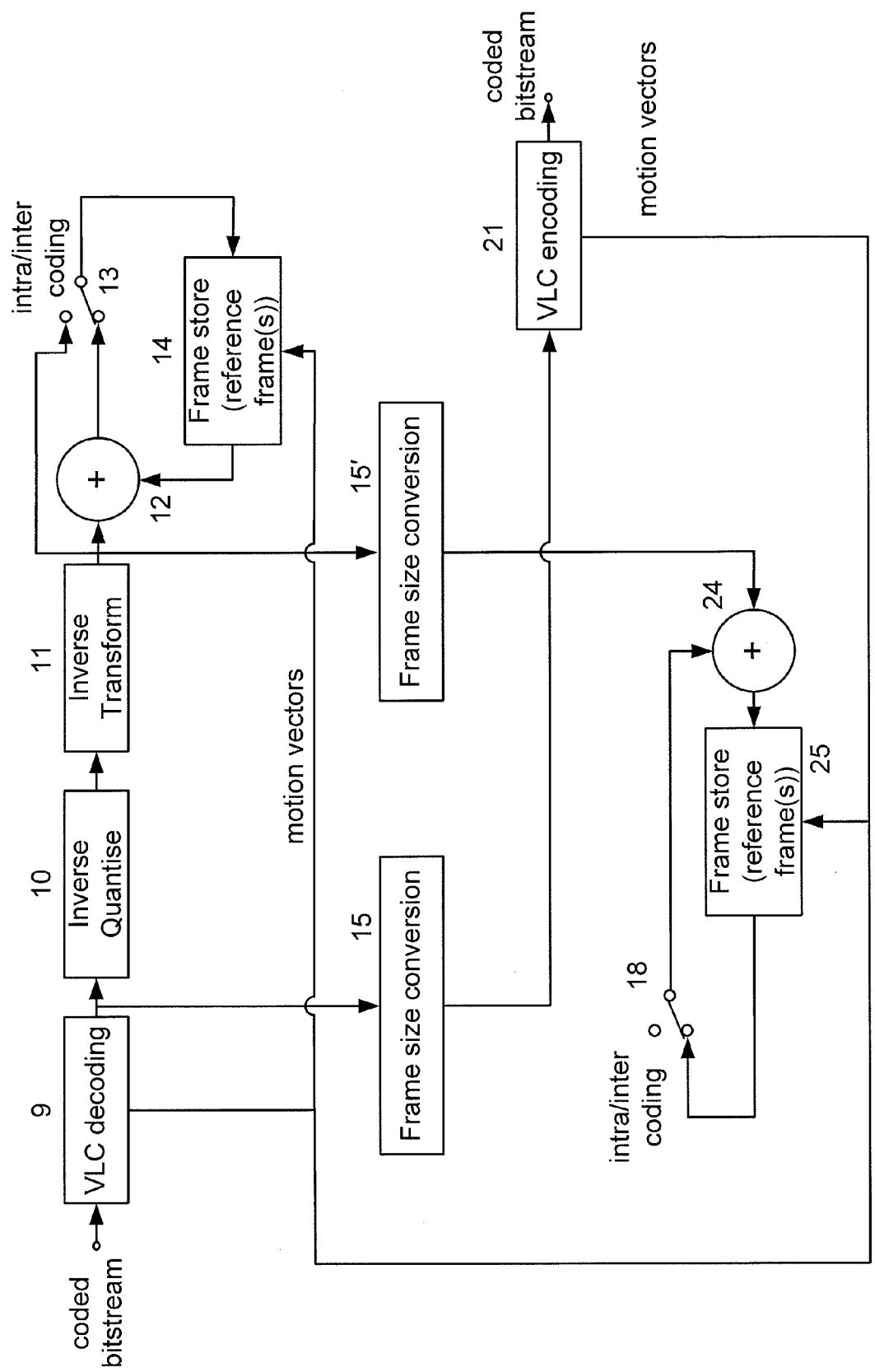
FIG. 4 is a simplified block diagram illustrating an optimized mode of a transcoder connection from a hybrid video codec to second hybrid video codec according to an embodiment of the present invention.

FIG. 4 is a block diagram of an optimized mode of the preferred embodiment for transcoding between two hybrid video codecs when the output codec to the transcoder does not support the features (motion vector format, frames sizes and type of spatial transform) of the input codec according to an embodiment of the present invention. This diagram is merely an example and should not unduly limit the scope of the claims herein. One of ordinary skill in the art would recognize many variations, alternatives, and modifications. The optimized mode is only available when the input and output codecs use the same spatial transform, the same reference frames and the same quantization. The optimized mode is used for inter macroblocks which have input motion vectors that are legal output motion vectors. In the optimized mode, the output of the VLC decoder 9 and the inverse spatial transform 11 are, after frame size conversion, fed directly to the variable length encoder 21 and the frame store update 24 respectively. This mode is significantly more efficient because it does not use the encode side spatial transform 19, quantizer 20, inverse quantizer 22 and inverse transform 23 modules. If the decoder motion compensation 12 and encoder motion compensation 24 employ different rounding conventions it is necessary periodically to run each frame through the full transcode path shown in FIG. 3 to ensure that there is no visible drift between the output of the original bitstream and the transcoder output.

The H.263 standard specifies that each macroblock must be intra coded at least once every 132 frames. There is no similar requirement in the MPEG-4 standard. In our method, to ensure that each macroblock satisfies the H.263 intra coding constraint, the transcoder tracks the number of frames since the last MPEG-4 I frame and, if there are more than 131 P frames in the MPEG-4 stream since the last I frame, forcibly encodes the decoded P frame as an I frame.

If the input codec supports "Not Coded" frames and the output codec does not the apparatus will convert the frame. One method of conversion is for the transcoder to drop the entire frame from the transcoded bitstream. A second method of conversion is for the transcoder to transmit the frame as a P frame with all macroblocks coded as "not coded" macroblocks.

In the case when no change is required in the content of the video payload, i.e., when the outgoing information adjustment is done only to the network packet, and the video bitstream is not to be modified. This happens when the bitstream is directly passed through in the transcoder. In the case of RTP, the timestamp is adjusted as well as marker bits. This minimizes the resource and computation requirement within the transcoder.

When a new packet from a different clip/source arrives while the decoder is in the middle of decoding a frame from a previous clip, it is possible that the data in the new packet information is treated as the continuation of the data in previous clip, resulting in wrong information being decoded. This can cause the first frame of the new clip, which is usually I frame, to be corrupted, and corruption is seen on the subsequent frames.

Memory usage is also an important part of transcoder design. In this case, the reference frame stores 14, 25 are normally implemented as two separate frames in conventional decoders and encoders. One is the reference frame (the previous encoded frame) and one is the current encoded frame. When the codec motion vectors are only allowed to take a restricted range of values it is possible to reduce these storage requirements. In our method, we reduce the storage requirements substantially by recognizing that the only reference frame macroblocks that are used when a macroblock is encoded are its neighbors within the range of the maximum allowed motion vector values.

Figure 5:
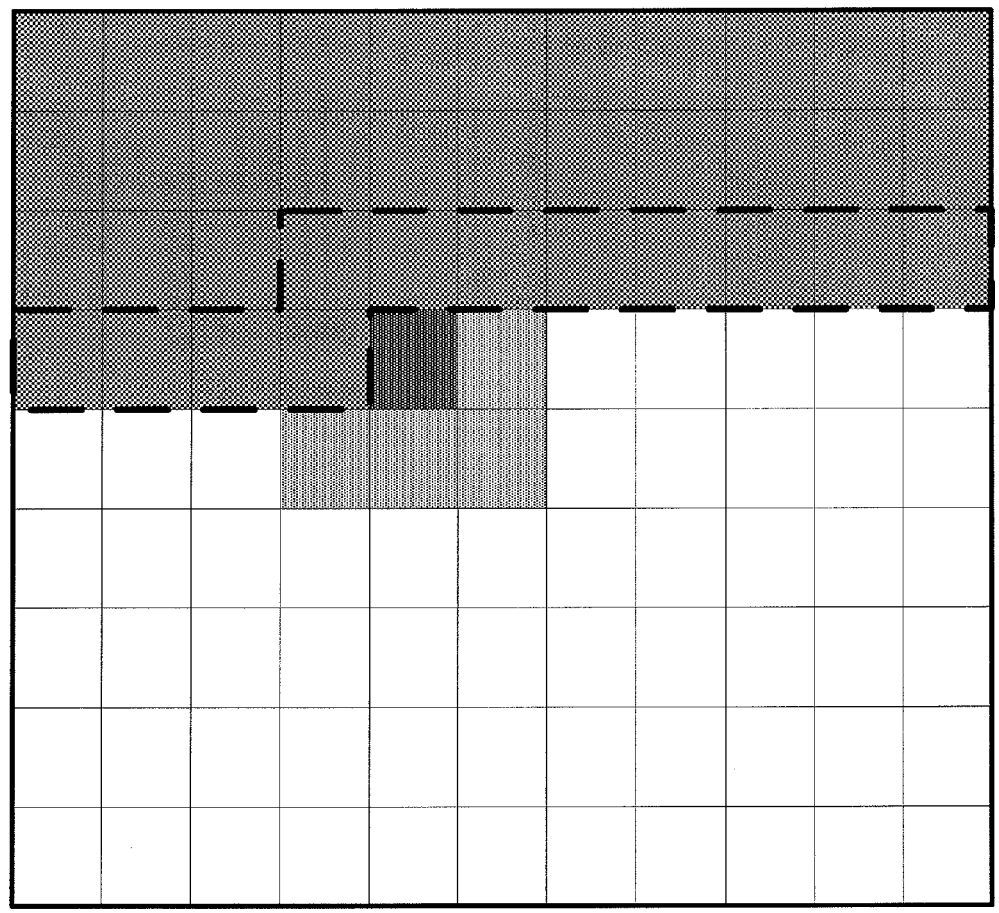
FIG. 5 is a simplified diagram illustrating how the reference frame and macroblock buffer are used during H.263 encoding according to an embodiment of the present invention.

FIG. 5 illustrates the macroblock buffering procedure using a QCIF sized frame 26 with its underlying 9 by 11 grid of macroblocks being encoded in baseline H.263 as an example. This diagram is merely an example and should not unduly limit the scope of the claims herein. One of ordinary skill in the art would recognize many variations, alternatives, and modifications. The macroblocks immediately surrounding 28 the macroblock currently being encoded 27 contain pixels in the reference frame that may be used for motion compensation during the encoding. The macroblocks preceding the macroblock being coded 27 have already been encoded 29. The maximum range of baseline H.263 motion vectors of −16 to 15.5 pixels. Instead of storing the current image, we maintain a macroblock buffer 30 that can hold the number of macroblocks in an image row plus 1. After each macroblock is coded, the oldest macroblock in the buffer is written to its location in the reference image and the current macroblock is written in to the buffer.

The buffer can also store whether or not each macroblock in the buffer is coded or "not coded". In the case of "not coded" macroblocks, our method will skip writing these macroblocks into the buffer and writing them back out to the reference frame as the macroblock pixel values are unchanged from those in the reference frame.

Both the input and output bitstreams of the transcoder can be one of several video coding standards. Some of the coding tools used are similar between the video coding standards, while others such as video header decoding, can be quite different. It is desirable to share some of the logic for the video decoding, encoding or transcoding, since some calculation use shared similar logic, or fit into a similar framework for control. From maintainability point of view, it is easier to update, improve or fix a part of a single decoder, encoder or transcoder, and have the patches propagate to different flavors of the decoder, encoder and transcoder. It is also easier to maintain a single rate control algorithm over multiple video codecs. From resource point of view, it is desirable to reduce code size and memory usage for a system that allows decoding, encoding or transcoding different favor of video coding standards. Especially in an embedded system such as gateway, where the amount of resources that use for efficient execution is fix, and channel density for the transcoder needs to be high.

The solution to this is a decoder, encoder or transcoder which contains a combination of shared resources as well as coding standard or mode specific modules, and having the control path links between them to allow bitstreams with different video coding standards to be transcoded from input bitstream coded with different coding standards, all within a single architecture. This allows multiple instances of a single generic transcoder with the same code base to be executed and share its memory, rather than having multiple independent transcoders built to support specific input and specific output video coding standards. From the high-level architecture, certain parts are specific for particular standard or particular "mode" of operation Modules which may be video coding standard specific include:
  For a decoder, these are: Header Decoding, VLC Decoding, Motion Vector Decoding
  For an encoder, these are: Header Encoding, VLC Encoding, Motion Vector Encoding
Modules for shared algorithms include:
  For a decoder, these are: Inverse Coefficient Transform and De-Quantization, Motion Compensation, Intra Prediction Decoding
  For an encoder, these are: Coefficient Transform and Quantization, Motion Compensation, Intra Prediction Decoding, Coefficient Inverse Transform and De-Quantization, Coefficient Transform and Quantization.
  For H.264 coding standard, most of the modules such as Coefficient Transform and Quantization, and its inverse are different from the logic used in previous coding standards such as H.263 and MPEG4. However, part of the motion compensation and motion estimation logic can be shared with the previous coding standard. In addition, the general flow of the data between modules is similar to that in the previous standard, except that the algorithm of the modules used in H.264 can be different from respective modules that perform similar functionality in other coding standard such as H.263 or MPEG4. For example, the H.264 uses integer coefficient transform, while standard such as H.263 and MPEG4 uses floating point or fixed point DCT transform for coding the coefficients.

Besides sharing modules which support different video coding standards, modules can be shared to support decoding, encoding or transcoding bitstream of same coding standard where a different "mode" is required to be supported within them. These can be different decoding methodology as specified by the same coding standard or different incoming data type. For example, when decoding the MPEG4 Simple Profile macroblocks, there are four modes of decoding: the normal P and I frames (PVOP and IVOP), the data partitioned PVOP and IVOP, short header mode for compatibility with H.263 standard, and non-coded macroblocks.

Figure 20:
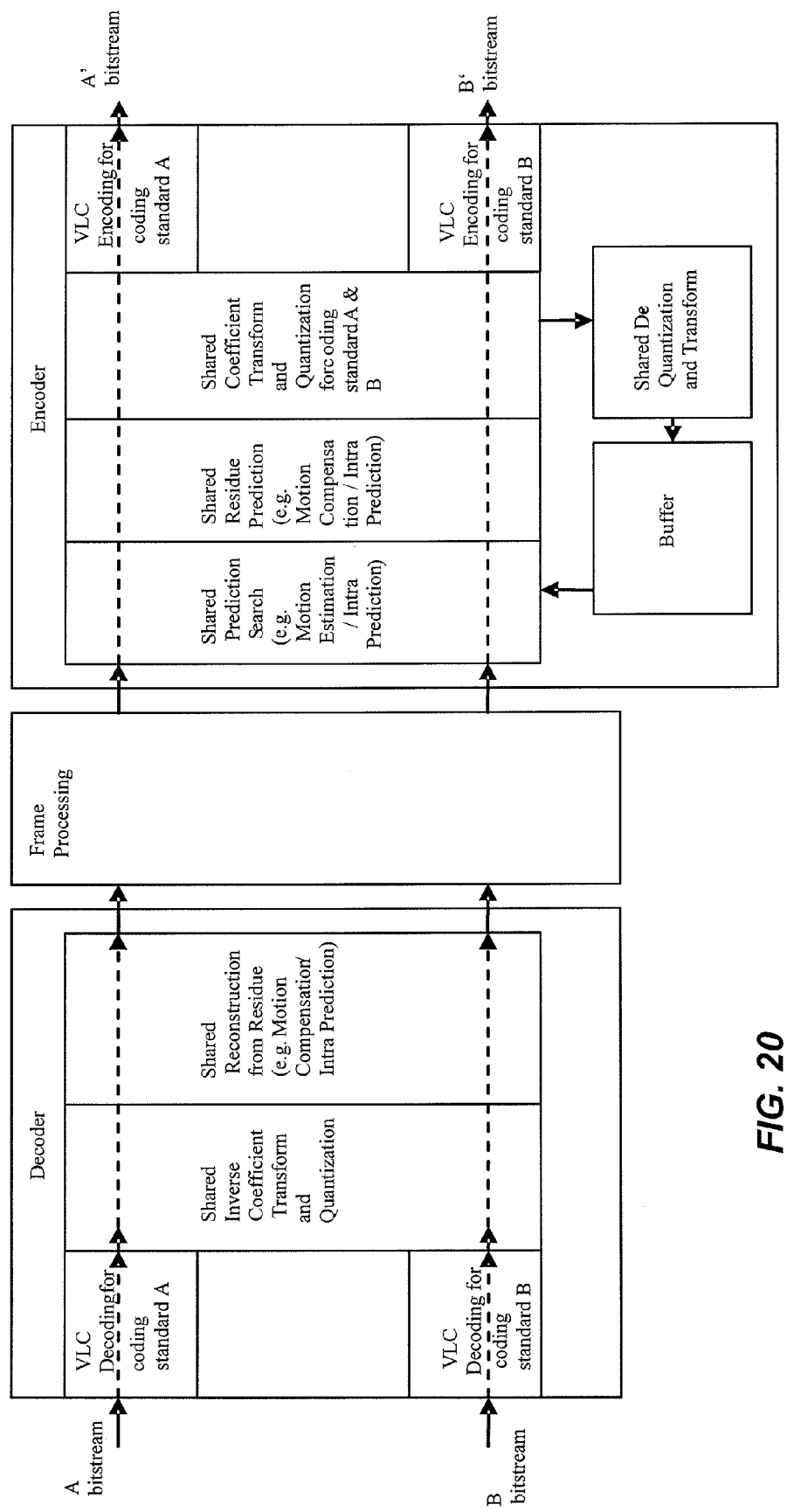
FIG. 20 is a diagram illustrating a generic structure of a transcoder which can transcode bitstreams with different video coding standards with shared modules and modules targeted to encoding and decoding data of specific video coding standards according to an embodiment of the present invention.

FIG. 20 specifies a simple generic architecture which consists of several shared and coding standard specific modules for decoding of block information such as block coefficient. The modules described here are generic, and a person skilled in the relevant art will recognize that other steps, configurations and arrangements can be used without departing from the spirit and scope of the illustration. In addition, video header decoding and encoding, which is required before the block transcoding, is not described in this illustration.

In this illustration, the transcoder support two coding standards, coding standard A and coding standard B. The concept can be extended to multiple other coding standards. The coding standard used in coding the output bitstream can be to the same or similar coding standard or mode used in the input bitstream, or alternatively, it can be a different coding standard. For example, the input can be H.263, MPEG4 simple profile, or even H.264. Similarly, the output can also be H.263, MPEG4 simple profile, or even H.264.

The bitstream is first decoded by VLC decoder for specific video coding standard. Following that, the shared modules are used to inverse transform the coefficients, and performed de-quantization, according to the quantization parameter that has previously decoded, for example, in both the slice header and the frame header. Frame reconstruction from residue is then performed. If the coefficients belong to predictive P blocks, motion compensation is performed to construct the frame. Intra prediction can also be performed when required. They can be in a shared module employed commonly even for different coding standard. In one embodiment, further processing such as frame resizing technique that described previously, or certain filtering can be performed for the constructed spatial block or frame data. In another embodiment, the decoded data is passed directly to the encoder within any processing.

In the encoder, the decoded data is first predicted when required. For P blocks, motion estimation is performed, and for Intra macroblock, intra prediction might be performed for coding standard that support the technique. This is followed by residue prediction, such as motion compensation for P predictive blocks, or intra prediction encoding for Intra blocks. This is followed by coefficient transform and quantization, which in one embodiment, is a shared module with coding standards A and B using the same coefficient transform and quantization technique. In another embodiment, the coefficient transform and quantiation is not a shared module since coding standard A and B do not share similar coefficient transform and quantization technique. For example, if one coding standard is H.264 while the other is H.263 or MPEG4. In addition, if the block is a predictive block, de-quantization and transform is performed, with the residue being placed into a buffer for future prediction.

Figure 21:
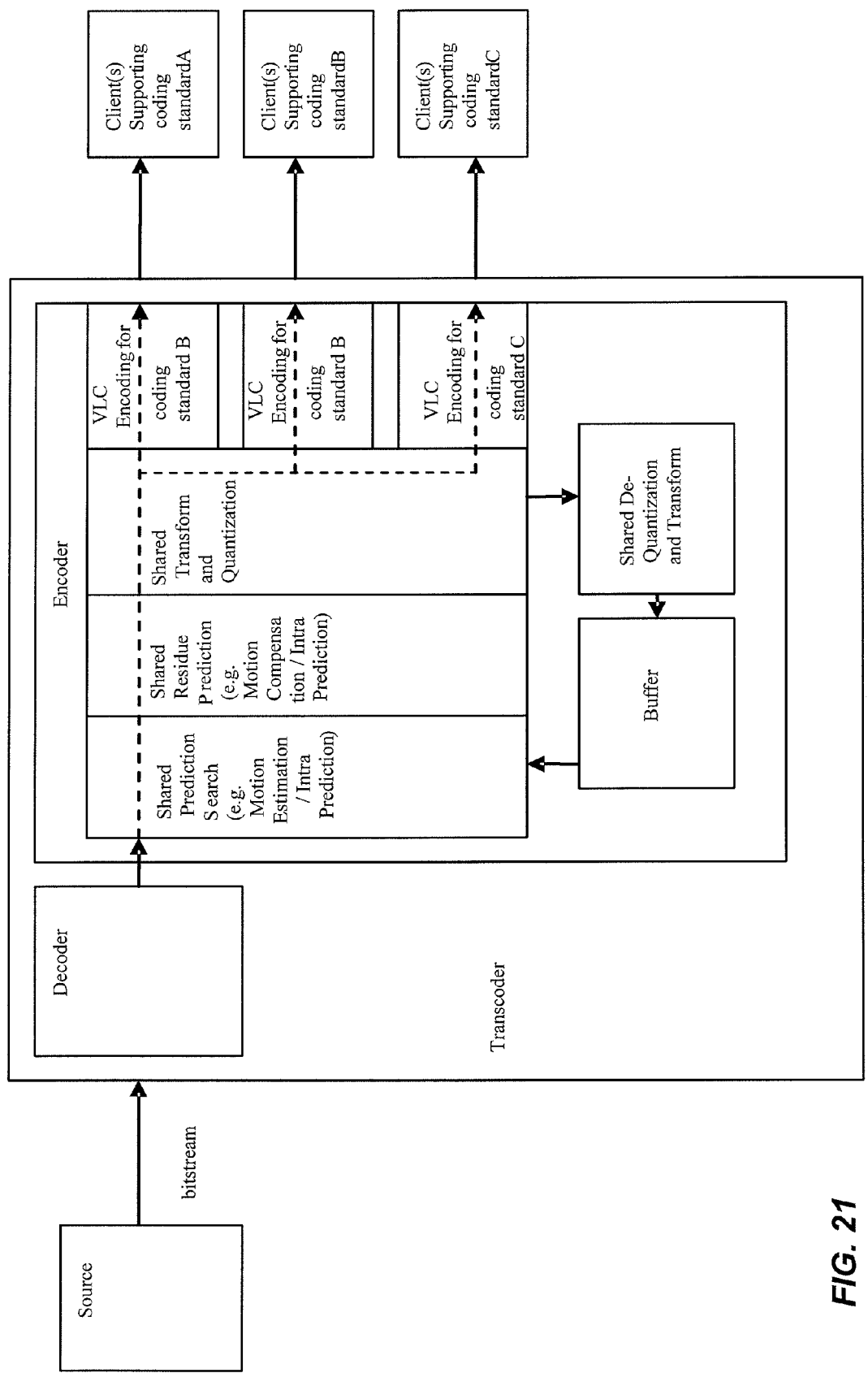
FIG. 21 is a diagram illustrating a generic structure of a transcoder used to broadcast video from a single source to clients which support different coding standards according to an embodiment of the present invention.

Another advantage of such architecture is to reduce computation and resource uses for broadcasting purposes. For example, when there are single source of video is being streamed to multiples clients supporting different coding standards using the transcoder, the splitting of data path for coefficient output for different coding standard is performed only at the last stage of the encoding. This is illustrated in FIG. 21, where the data path of the encoding is spitted only when it is necessary, in this case, just before the VLC encoding if encoding logic for video standards A, B and C can used the same motion estimation, motion compensation, or even quantization and coefficient transformation.

Figure 22:
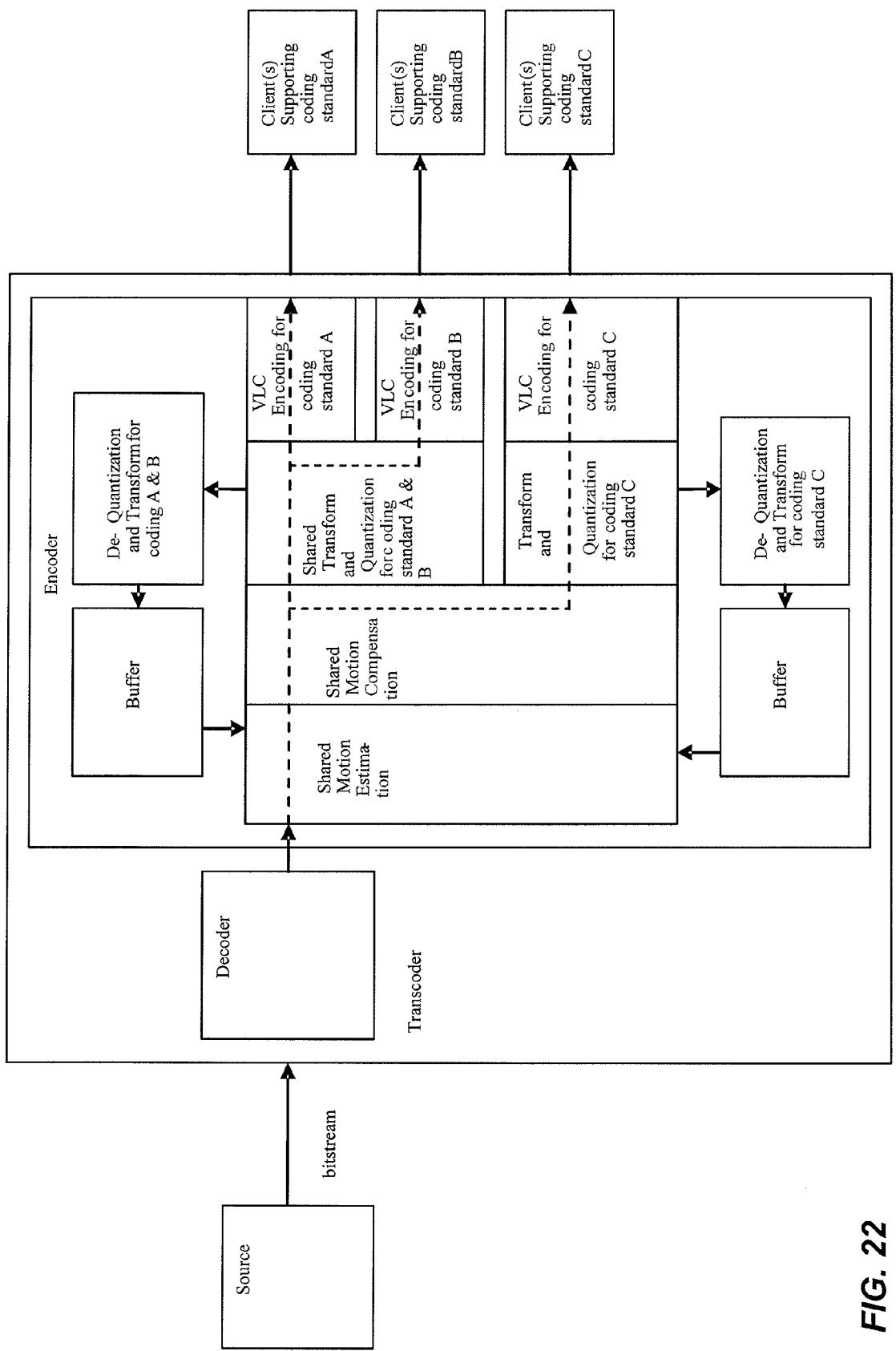
FIG. 22 is a diagram illustrating a generic structure of a transcoder for broadcasting video from a single source to clients which support different coding standards according to an embodiment of the present invention.

The data needs not be split simultaneously from the same location in case multiple coding standards are utilized. They can be split in multiple places whenever necessary. This is illustrated in FIG. 22. In a mixed output coding standard encoding, for example, when the output is H.264, MPEG4 simple profile and H.263, the data path for encoding macroblock can split before encoding the transform coefficients and quantization, since the H.264 has a different transform coefficient and quantization encoding technique as compare to MPEG4 simple profile and H.263. The data path is again split before VLC encoding for MPEG4 and H.263, since they uses the similar transform coefficient and quantization, but different VLC encoding. This will reduce resources and computation for broadcasting to clients supporting different coding standards, thus increasing the number of channel allowed in the system.

In addition to encoding to different video coding standard, the video bitstreams can be transported in different means to the clients. For example, in the case of IP based network, one video bitstream can be transported within RTP via RTSP, while another video bitstream can be muxed with audio and transported using progressive download via HTTP. The video can be coded with the same, or even different video coding standards for different ways of transporting.

Another embodiment employs in a standalone encoder in, whereby the video data is fed directly into the encoder. One such case is the video being received a from live source, which is being encoded and broadcast to different clients supporting different video coding standards.

Besides sharing modules, the computation and resource requirement can be further reduced by using a simple pass-through as much as possible without any of the decoding and re-encoding any of the bitstream, whenever transrating is not required. It is desirable to have the simple-pass-through to co-exist with the rate converter, which consists of decoding and encoding modules. In this case, the transcoder can switch between the two modes of operation for the most computation efficiency.

The hybrid trans-rater operates on the incoming data packets to produce outgoing data packets by switching between two operations: the simple pass-through and rate converter. An advantage of using such operation is that the simple pass-through allows reduced algorithmic delay and uses less computation than the normal rate conversion technique. Thus, the hybrid trans-rater employs simple pass-through when the circumstances allow.

The simple pass-through involves operations that do not change the content of the media bit-stream. In other words, the raw media is fully decoded from the incoming bit-stream should be exactly the same as the raw media fully decoded from the outgoing bit-stream. Simple pass-through usually either does not require to decode the content of the bit-stream, or involves limited decoding of bit-stream, such as extracting the header information, for example, to know the frame type or macro-block type (such as Intra or Inter frame) and the boundary of the entities (for example, macro-block) within the media bit-stream.

The rate converter is used when the outgoing network bandwidth is different from the incoming network bandwidth, and the change in bandwidth may occur dynamically. It provides the capability to change the bitrate of the media bit-stream such that it can fit into the outgoing network with the integrity of the media still intact, and only the quality differs roughly according to the rate reduction. This rate converter is different from packet dropping, in which the integrity of the media can drop dramatically (uncontrolled or unintelligent reduction in transmitted media). This operation for changing the bitrate is also known as trans-rating.

The decision as to which of the two operations to be used can also change dynamically in real time during the transcoding. This technique is usually used when the coding standard and restriction of the incoming bit-stream and outgoing bit-stream are the known, and bandwidth of the network might vary dynamically.

The decision as to which of the two operations is to be used can be determined before the media is converted, for example, during session setup in the media gateway when two data terminals, connected to the media gateway negotiate to exchange the media. This is possible if the system determines that the media coding standard and restriction used for the incoming media and outgoing media are the same, and the outgoing network bandwidth is larger than the incoming network bandwidth. In addition, such decisions can be pre-determined, and the system executes only one operation, if it is known that the conditions are always true for the transcoding.

Note that the condition for switching is not limited to switching between simple pass-through and transrating. The same conditional check can be applied to switching between an optimized mode and full transcoding as described earlier. Thus, in the following paragraphs, the switching condition that allows the switch between the simple pass-through and full transrating can also be applied to switching between optimized mode and full transcoding mode.

Figure 14:
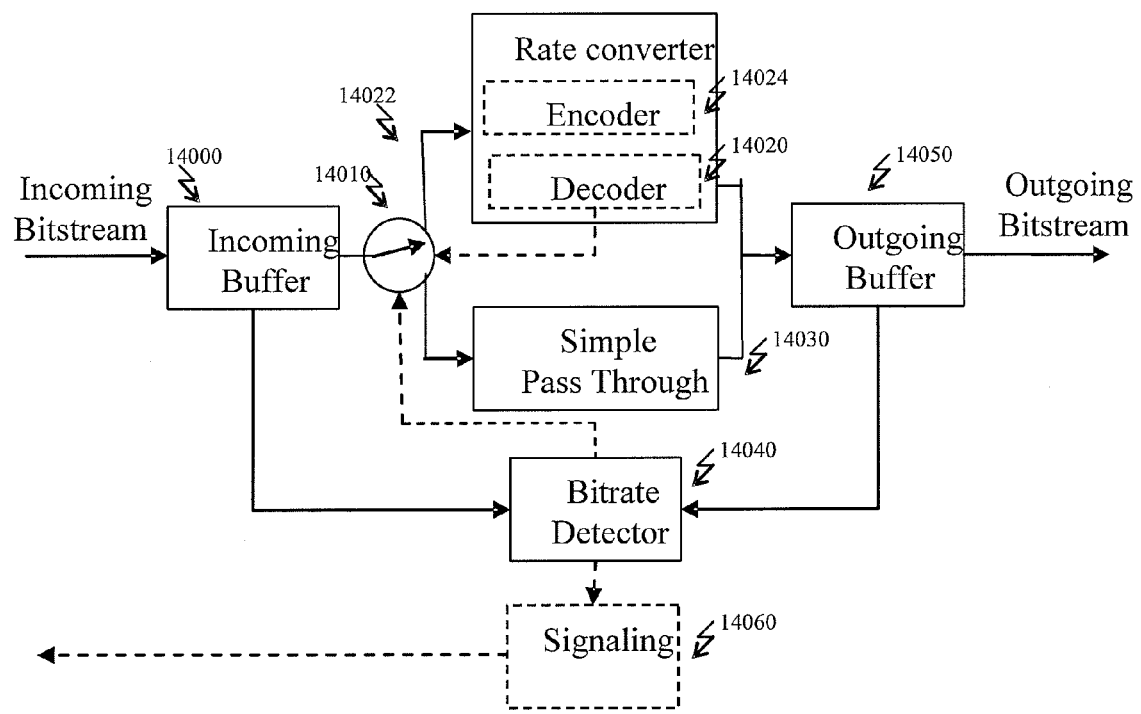
FIG. 14 illustrates an apparatus for smart pass-through operation according to an embodiment of the present invention.

An embodiment of the apparatus for transrating when the switching operation changes dynamically in real-time is illustrated with reference to FIG. 14. Modules containing in the apparatus includes:

An incoming buffer 14000 which receives the data packets from the incoming network transmitted from a source data terminal.

An outgoing buffer 14050 which sends out the data packet to the outgoing network transmitted to the destination data terminal.

A bitrate detector 14040 for detecting the fullness of the buffer, so as to estimate the dynamic bandwidth of the outgoing network. Information from the incoming buffer is also fed to a bitrate detector.

A signaling module 14060, which is optional. It feedbacks the information on the outgoing network bandwidth to the source data terminal that sends the incoming buffer so as to reduce the incoming media bitrate.

A switch 14010 which changes the data path of the packets between simple pass-through and rate converter modules, depending on the conditions and approach that is used for the switching. Dynamic switching of the data path between pass-through and rate converter operation is allowed if certain situation occurs and certain conditions are satisfied. The switch includes a decision module for switching, which in one approach, performs low-level partial decoding of the incoming bit-stream to identify some prerecorded information within the bit-stream, for example, the frame type and macro-block type. In another approach, it also obtains information from the decoder in the rate converter to determine if switching is possible. This is shown as a dotted data path from decoder 14020 to switch 14010 with reference to FIG. 14.

A simple pass-through module 14030 which decodes the packet and repackages the media stream unit from the incoming buffer to the Outgoing Buffer. The module is considered to be lightweight in that it does not decode the incoming media bit-stream.

A rate converter module 14020 which decodes the bit-stream of the media from the incoming buffer. The rate converter includes a decoder 14024 and encoder 14020 that performs at least a partial re-encoding of the media bit-stream, if not the full re-encoding of the media bit-stream. In one embodiment, the decoder is a fully operational decoder and it extracts the bit-stream directly from the incoming buffer and performs a full decoding even if the data path is switched to the Pass-through Module 14030 by the switch 14010.

In one embodiment of the apparatus for hybrid trans-rating, the apparatus for the simple pass-through module is the reduced algorithmic delay media stream unit conversion, and the rate converter module includes a module for decoding the full or partial media stream unit from the data packet, and re-encoding to a new media stream unit and repackage it into the data packet. The apparatus for decoding and re-encoding the bit-stream in partial media stream unit is the apparatus for Reduced-Algorithmic-Delay Rate Conversion.

In another embodiment of the apparatus for hybrid trans-rating when the switching operation changes dynamically in real-time is the apparatus for reduced algorithmic delay media stream unit conversion, in which the outgoing packet construction module involves switching between a simple bit-stream copying to reconstruct the media stream unit, and a rate converter to decode and re-encode the incoming bit-stream in the partial media stream unit.

Figure 15:
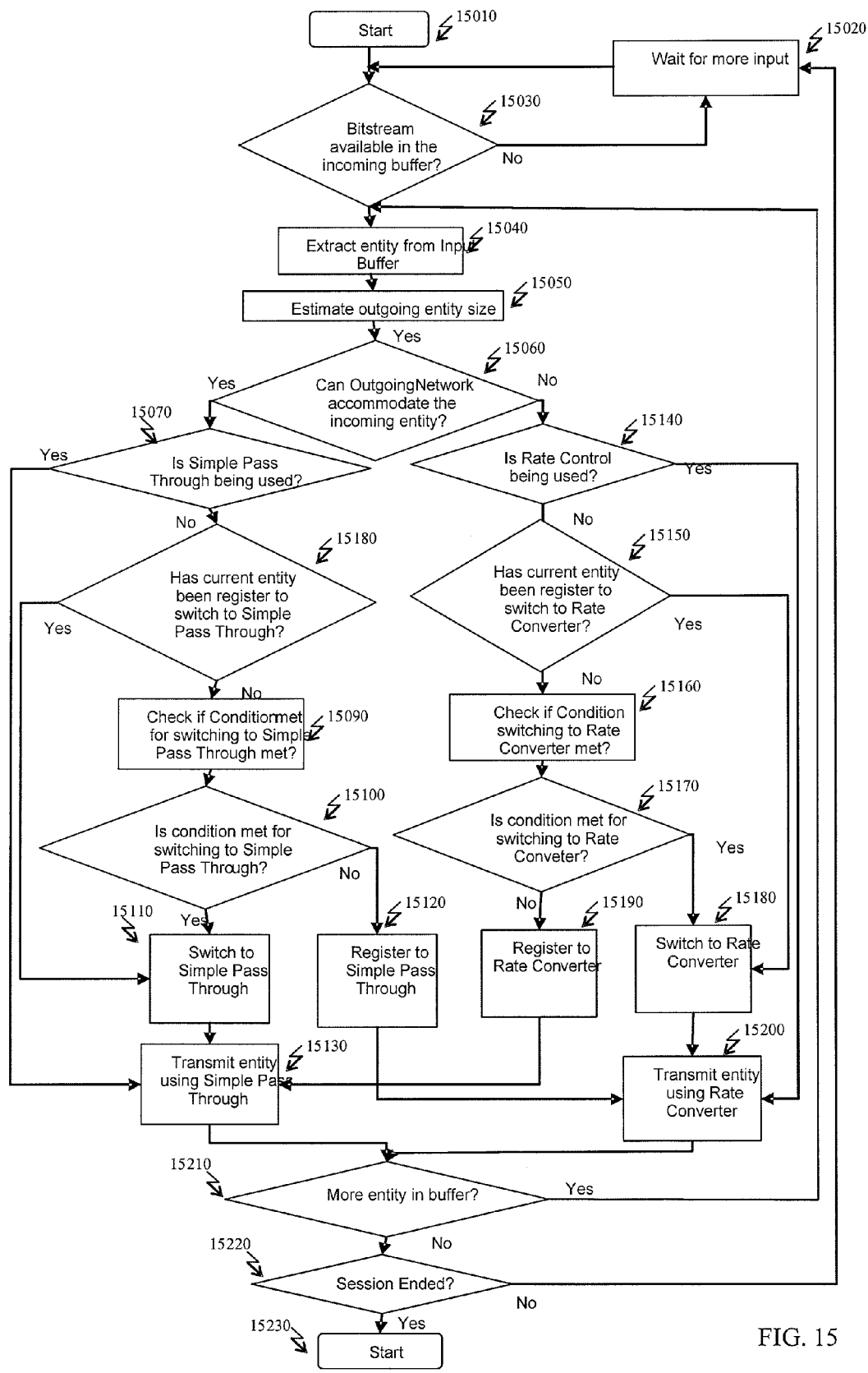
FIG. 15 illustrates an embodiment for the method for smart pass-through operation according to an embodiment of the present invention.

A detailed embodiment of the process of dynamic switching between pass-through and rate control in hybrid trans-rating is shown in FIG. 15. Dynamic switching of the data path between pass-through and rate converter operation is allowed if certain situations occurs and certain conditions are satisfied. The decision module 15060 determines if the situation is suitable, and the modules 15090 and 15160 determine if the conditions are satisfied.

There are at least two types of switching: frame-by-frame switching and macro-block-by-macro-block switching. Depending on the type of switching, this determines if the entity extracted from the bit-stream in step 15040 is a frame or a macro-block respectively. In the frame-by-frame basis switching, the switching operation is only allowed at the start of the frame. If the bit-stream that is being currently analyzed does not contain the start of the frame, the switching operation is delayed until the start of the frame is encountered in the future bit-stream. Such frame-by-frame operation has simpler condition checking criteria for switching. This means that switching is not instantaneous, and might not occur when the current media bit-stream is being processed. In addition, such decision may be reversed if the condition changes in the upcoming bit-stream before the start of a new frame changes. For example, a decision might be made to change the data path from rate converter to pass-through, and after the decision is made, the bandwidth of the outgoing network changes, and the decision is forced to revert back to rate converter even before such switching occurs. The approach that is taken to implement the operation on whether a full decoder is used has an effect of which switching operation is allowed.

A situation that triggers the switching operation from pass-through to rate converter is that the bandwidth of the outgoing network cannot accommodate the bitrate of the incoming bit-stream. This happens when the bandwidth of the outgoing network decreases, or the bitrate of the incoming media bit-stream increases, or under circumstances where the bitrate is increased, or the combination of any of the three situations. The bitrate of the media bit-stream increases when more information is inserted into the bit-stream or when that part of the bit-stream is re-encoded in a different format. One example whereby the bit-stream is re-encoded is where the system re-encodes a P (predictive) frame to an I (intra) frame. This can happen when the system receives a Video Fast Update (VFU) request generated by the data terminal in the outgoing network which detects an error in its decoding of the media bit-stream. As an I frame is larger than a P frame, the bitrate can increase dramatically even though the decoded frame quality is similar.

A situation that triggers the operation from rate converter to pass-through is that the bandwidth of the outgoing network can accommodate the bitrate of the incoming bit-stream. In addition, there is no additional requirement that the format of the outgoing media bit-stream has to be changed, or even if there is such a request, the outgoing bandwidth is still large enough to accommodate the changes.

The conditions that allow the switching operation depends on the approach that is taken to implement the operation. There are at least three approaches to enable the switching operation.

In a first embodiment, the condition for switching between simple pass-through and rate converter is satisfied if any of the three possibilities occurs. Switching is only allowed on both the frame-by-frame basis and the macro-block-by-macro-block basis.

The first possibility is that the incoming frame is an intra frame, the second possibility is that the frame contains only intra macro-blocks. One embodiment of the process of checking the condition in Step 15090 and 15160 of FIG. 15 is explained with reference to FIG. 16, which use the combination of the first two possibilities. The switching condition is met when the system realized that the incoming frame type, indicated by the frame header information, is an I frame in decision 16020. In this case, the following bit-stream following the header can be switched either from simple pass-through to rate converter or vice versa. If this is not met, decision 16030 determines if all the macro-blocks in the current frame are all intra macro-blocks. This is used if the current frame is a P frame. In this case, the switching is only possible if the last macro-block of current frame is in the bit-stream. If it is found that the bit-stream does not contain the last macro-block, it is necessary to cache up the macro-block type of the macro-block in the frame, and decision is made only when the last macro-block type is known. Switching can be executed on all the macro-blocks in the frame if it is determined that all the macro-blocks in the frame are intra macro-blocks.

The third possibility is that any condition that is to ensure the frame has been "refreshed" entirely. An example in which the last possibility occurs is when the Intra macro-block is distributed across a sequence of consecutive frames, such that the macro-blocks in the last frame of the consecutive frame sequence that does not depend of any of the blocks before the consecutive frame sequence. This can happen, for example, when spatial intersection of the intra macro-blocks across the consecutive frame sequence covers the entire frame, and that once an intra macro-block appear in any of the consecutive frame, the macro-block in the same position in the subsequence frame is skip blocks.

In this case, the system decides whether switching between simple pass-through and rate converter is probable each time when any of the three conditions is satisfied.

In a second embodiment, the incoming bit-stream is always fully decoded. Such decoding is performed on the decoder in the rate conversion. This is performed because, in rate conversion, the re-encoding of the media bit-stream using a predictive (P) frame of different quality generally requires the decoded frame from the decoded bit-stream. The decoder 14020 and its associated data path 14022 is illustrated with respect to FIG. 14.

In the second approach, dynamic switching from simple pass-through to rate converter does not depend on the characteristic of the incoming bit-stream, and can be performed anytime on a frame-by-frame or macro-block-by-macro-block basis. Thus, the condition in decision 15170 of FIG. 15 is always met in this approach and switching to rate converter in step 15110 is always possible. In addition, operation in step 15160 is not performed. In this approach, the entity to be analyzed can either be a macro-block or a frame, and the switching process can be done in macro-block-by-macro-block or frame-by-frame basis, respectively.

In the second approach, dynamic switching from rate converter to simple pass-through without error only occurs under certain condition. There are three embodiments to output the such bit-stream.

One embodiment is to allow switching only when the decoded output bit-stream from the simple pass-through matches the decoded output bit-stream exactly. Theoretically, from the perspective of video coding, simple pass-through can be used without any drift error if the raw media fully decoded from the media bit-stream from the incoming network is exactly the same raw media fully decoded from the outgoing bit-stream. This happens if incoming frame is an I frame or frame contains entirely of Intra blocks, or that if the incoming frame is a P frame, the reference frame used for decoding the P frame, or hypothetical reference frame used if the P frame is decoded, is exactly same as the reference frame used for encoding the outgoing frame, or hypothetical reference frame used if encoding is performed. The process switching is illustrated with respect to FIG. 17, and this is generally done on frame-by-frame basis. The same reference frames from the encoder and decoder are extracted in step 17040 and step 17050. Their differences are then calculated between the two reference frames of the same location in step 17070. In one embodiment, the difference function is the sum of absolute difference between the spatial values of the reference frames. If this difference is found to be smaller than a threshold in decision 17070, the reference frames are considered to be similar, and the condition for switching is met. Otherwise, the condition is not met.

It is possible in this embodiment to perform the switching in macro-block-by-macro-block basis. This process is illustrated with respect to FIG. 11.

Another embodiment is for the rate converter to generate an outgoing P frame that has a quality which is the same as or higher than the current incoming P frame, before the operation is switched to simple pass-through for handling the next incoming P frame. This operation allows the bitrate of the outgoing bit-stream to be similar to that of the incoming bit-stream. This is explained with reference to FIG. 18, where by the quality of the previous frames in the encoder is extracted in step 18020 and the quality of the previous frames of the same location in the decoder is extracted in step 18030. The two qualities are then compared and when all of the quality differences between respective frames are less than a threshold, the condition for switching is satisfied.

It is possible for the rate converter to generate an outgoing I frame with the quality that is same as or higher than the current incoming P frame, before the operation is switched to simple pass-through for handling the next incoming P frame. However, this may lead to a sudden increase in bitrate as outgoing I frame of the same quality is generated from incoming P frame. In addition, the quality in I frame is different from the quality in P frame even the same quality control parameter, known as quantization parameter, is used.

Another embodiment is for the rate converter to compare the reference frame stored in its decoder to the reference frame stored in its encoder when full decoding and full encoding are performed. P frame is output if the two reference frames are confirmed to be similar, otherwise, either an I frame is output, or that I macro-blocks are output in the spatial region in the macro-block location where the differences between the reference frame stored in its decoder to the reference frame stored in its encoder are above a defined threshold.

Figure 16:
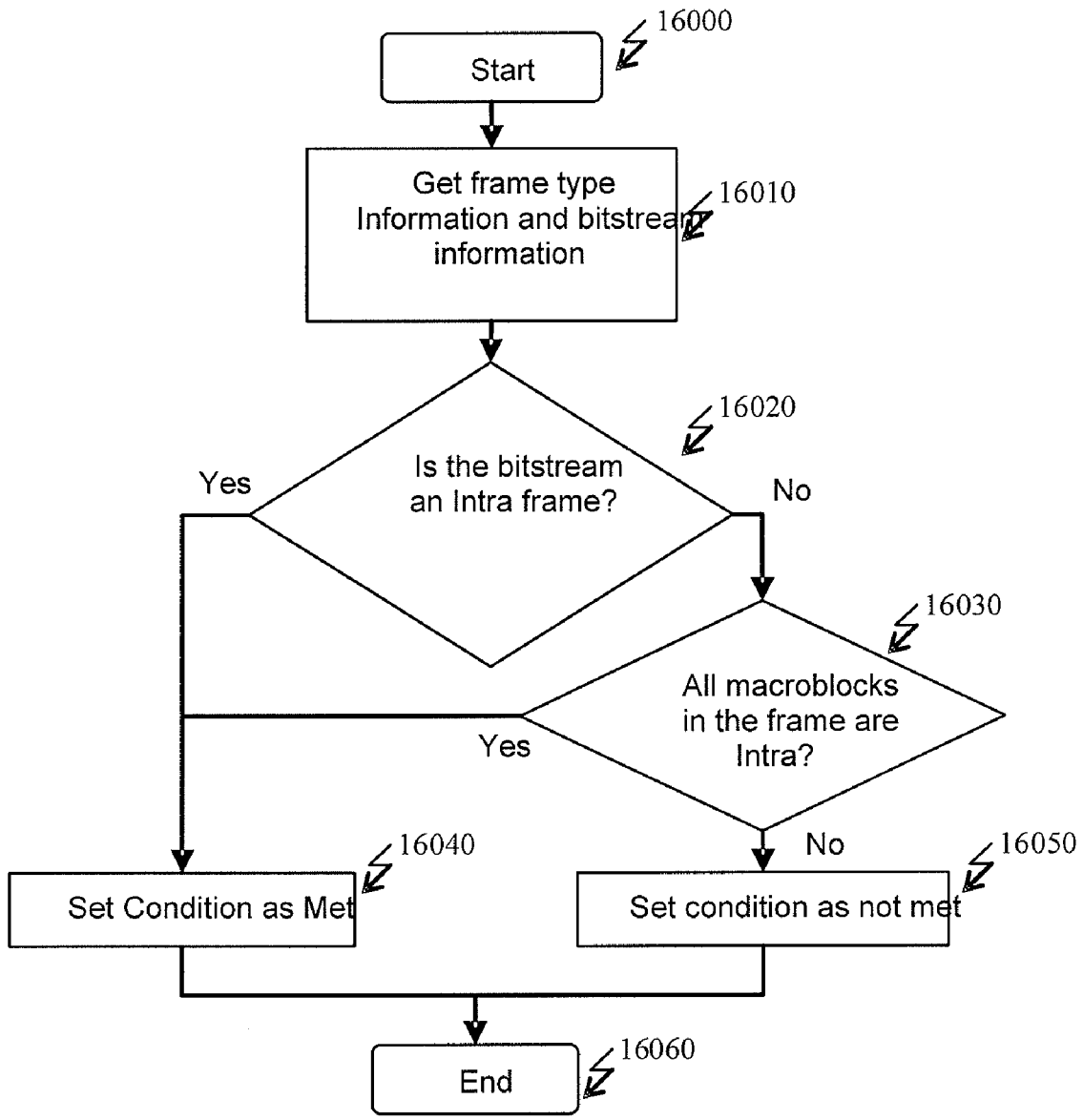
FIG. 16 illustrates an embodiment for determining a condition for switching from simple pass-through to rate converter, and for smart pass-through operation according to an embodiment of the present invention.
Figure 17:
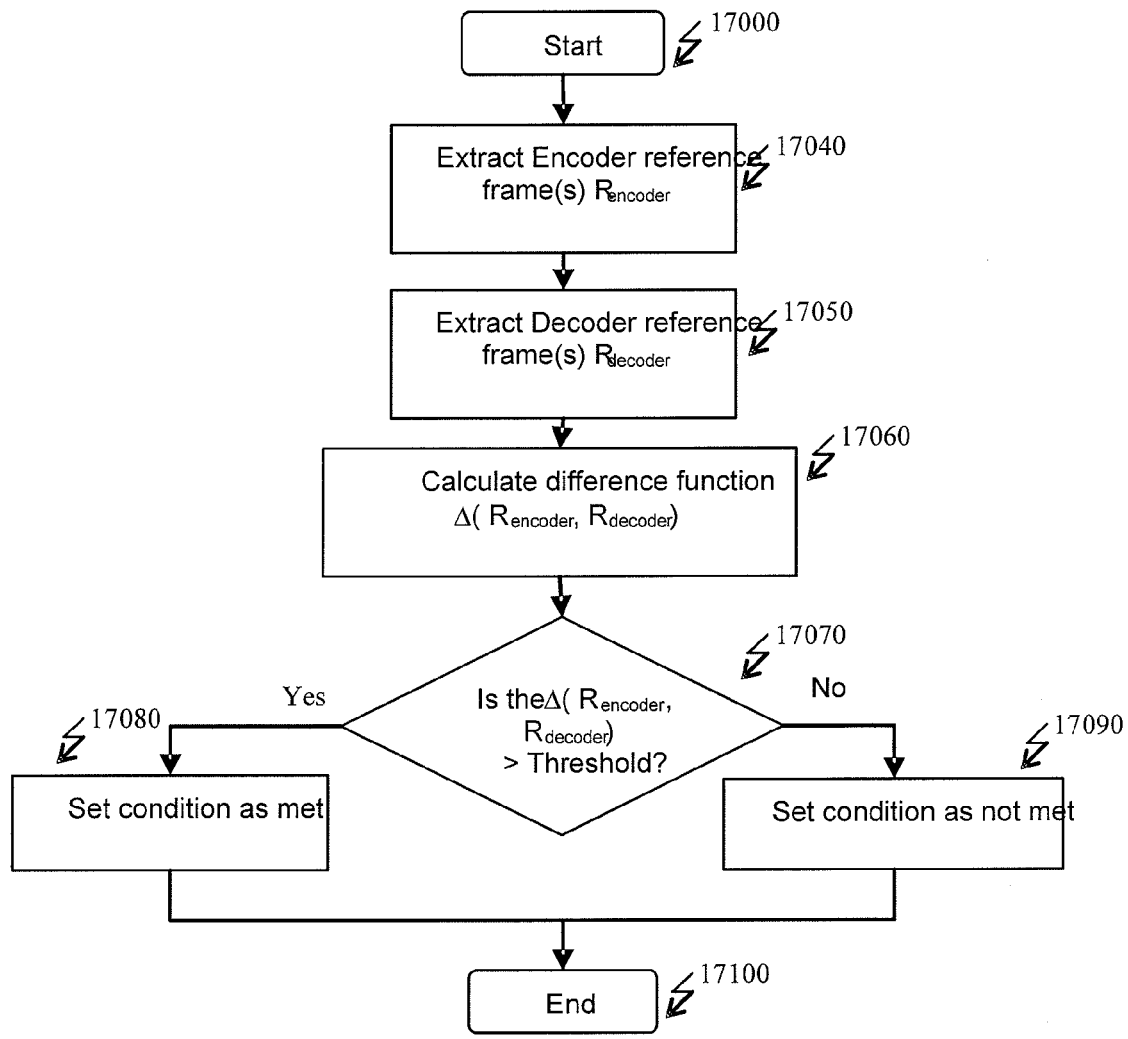
FIG. 17 illustrates an embodiment for determining a condition for switching from rate converter to simple pass-through, and for smart pass-through operation according to an embodiment of the present invention.
Figure 18:
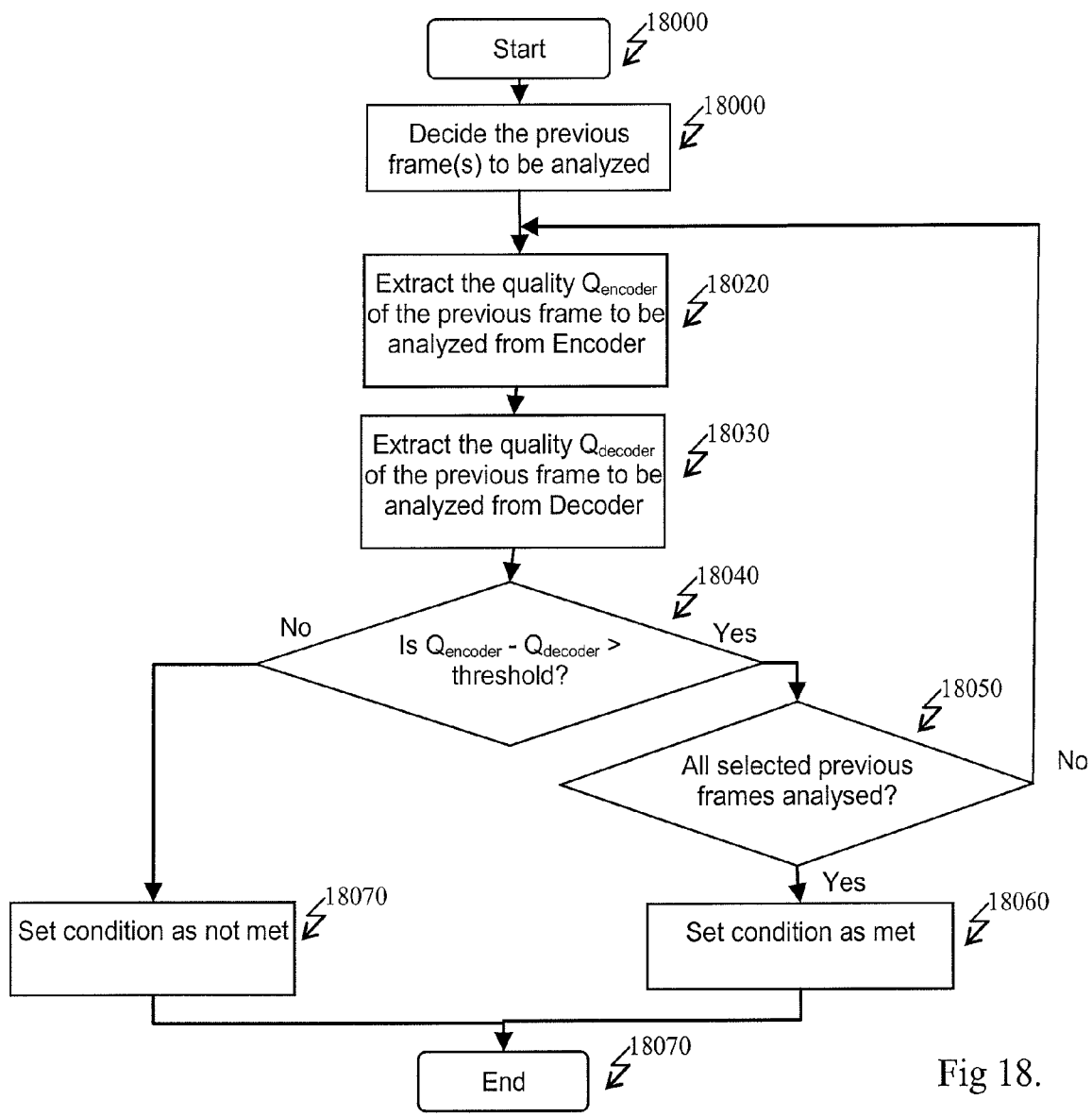
FIG. 18 illustrates an embodiment for determining the condition for switching from rate converter to simple pass-through, and for smart pass-through operation according to an embodiment of the present invention.
Figure 19:
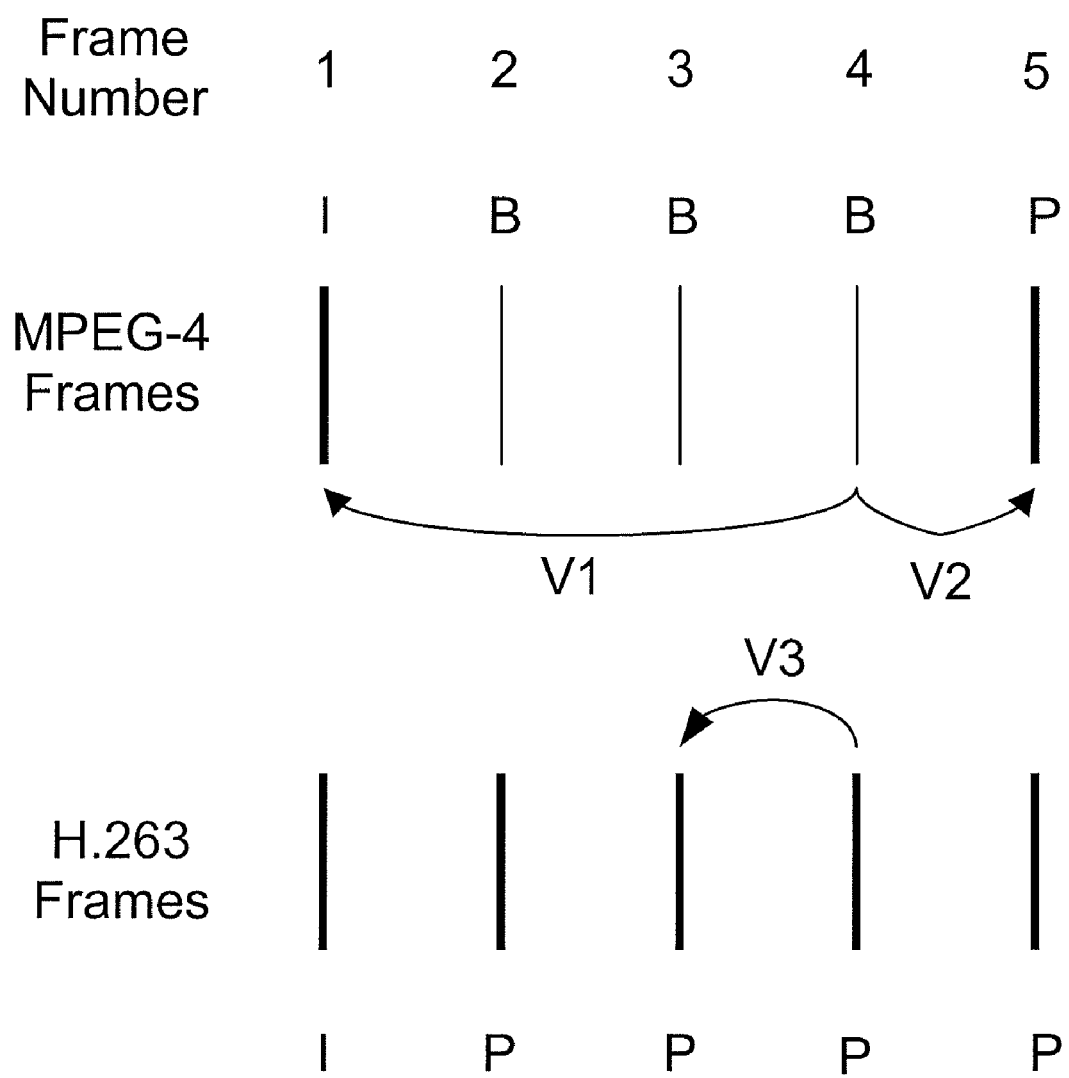

In one embodiment a combination of operations is used as described in reference to FIG. 16 for handling incoming I frame or P frame containing all I macroblock, and operation described in FIG. 17 or FIG. 18 or other embodiment described for handling other incoming P macroblock. In this embodiment, the operation described with reference to FIG. 15 is executed first. If the condition is not met, either operation described in FIG. 17 or FIG. 18 or other embodiment described for handling other incoming P macroblock is executed.

The same condition check described in FIG. 16, FIG. 17 and FIG. 18 can be applied to switching between optimized mode and full transcoding as described early.

In one embodiment, an apparatus is provided for transcoding an input video bitstream formatted to a first hybrid video codec standard or a second hybrid video codec standard different to the first hybrid video codec standard. In an embodiment, the apparatus produces an output video bitstream formatted to an output hybrid video codec standard. The apparatus includes an input adapted to receive the input video bitstream. The apparatus also includes a first variable length decoder and a second variable length decoder. The apparatus further includes a variable length encoder to encode the output video bitstream, and a conversion unit coupled to the first variable length decoder, the second variable length decoder, and the variable length encoder. Moreover, the apparatus includes an output adapted to transmit the output video bitstream.

In another embodiment, an apparatus is provided for transcoding an input video bitstream formatted to a first hybrid video codec standard. In an embodiment, the apparatus produces an output video bitstream formatted to a first output hybrid video codec standard or a second output hybrid video codec standard different to the first output hybrid video codec standard. The apparatus includes an input adapted to receive the input video bitstream and a variable length decoder. The apparatus also includes a first variable length encoder and a second variable length encoder. The apparatus further includes a conversion unit coupled to the variable length decoder, the first variable length encoder, and the second variable length encoder. Moreover, the apparatus includes an output adapted to transmit the output video bitstream.

Embodiments of the transcoders using the methods described herein have been realized as machine executable software instructions, and the present invention is carried out in a processing system by a processor executing the instructions. The method is equally suitable for realization in the form of an electronic integrated circuit The previous descriptions of the preferred embodiments are provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus for transcoding an input video bitstream formatted to an input hybrid video standard to produce an output video bitstream formatted to an output hybrid video codec standard, the apparatus comprising:
    an input adapted to receive the input video bitstream;
    a variable length decoder coupled to the input, the variable length decoder adapted to decode the input video bitstream;
    a conversion unit;
    an optimized mode conversion unit;
    a switch coupled to the conversion unit and the optimized conversion unit, the switch adapted to select usage of one of the conversion unit or the optimized mode conversion unit, wherein, the switch selects the optimized mode conversion unit if the input and output codecs use one or more of the same transform, reference frames or quantization;
    a variable length encoder coupled to the output, the variable length encoder adapted to encode the output video bitstream; and
    an output adapted to transmit the output video bitstream.

2. The apparatus of claim 1 wherein the conversion unit comprises a transrating module and the optimized conversion unit comprises a pass-through module.

3. The apparatus of claim 1 wherein the conversion unit comprises an inverse DC and AC prediction module and the optimized conversion unit comprises a direct-copy module.

4. The apparatus of claim 1 further comprising a determination module coupled to the switch, wherein the determination module is adapted to determine if one or more of a plurality of input motion vectors is supported by the second hybrid codec.

5. The apparatus of claim 1 further comprising using the conversion unit instead of the optimized mode conversion unit to prevent build up of a drift error over time in a transcoding process.

6. The apparatus of claim 1 wherein the conversion unit is further adapted to convert an input P frame into an output I frame.

7. The apparatus of claim 1 wherein the optimized mode conversion unit is coupled to the variable length decoder and the variable length encoder.

8. The apparatus of claim 1 wherein the optimized mode conversion unit is coupled to the input and the output.

* * * * *